United States Patent
Holt et al.

(10) Patent No.: US 12,338,189 B2
(45) Date of Patent: *Jun. 24, 2025

(54) DESENSITIZED FERTILIZER COMPOSITIONS AND METHODS OF MAKING SAME

(71) Applicant: Defuse Technologies, LLC, Mountain Brook, AL (US)

(72) Inventors: Timothy Gene Holt, Florence, AL (US); Keith D. Cochran, Killen, AL (US); Matthew P. Spotswood, Birmingham, AL (US); James Taylor Pursell, Jr., Mountain Brook, AL (US)

(73) Assignee: Defuse Technologies, LLC, Mountain Brook, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/673,450

(22) Filed: May 24, 2024

(65) Prior Publication Data
US 2024/0391840 A1 Nov. 28, 2024

Related U.S. Application Data

(60) Provisional application No. 63/468,625, filed on May 24, 2023.

(51) Int. Cl.
*C05C 1/02* (2006.01)
*C05B 7/00* (2006.01)
(Continued)

(52) U.S. Cl.
CPC ............... *C05C 1/02* (2013.01); *C05B 7/00* (2013.01); *C05C 5/00* (2013.01); *C05C 5/02* (2013.01); *C05C 5/04* (2013.01); *C05G 5/12* (2020.02)

(58) Field of Classification Search
CPC .... C05C 1/02; C05C 5/00; C05C 5/02; C05C 5/04; C05G 5/12; C05B 7/00
See application file for complete search history.

(56) References Cited

U.S. PATENT DOCUMENTS 2,092,054 A * 9/1937 De Rewal ................ C05C 1/02
71/30
3,321,297 A * 5/1967 MacArthur ............... C05B 7/00
71/64.1
(Continued)

FOREIGN PATENT DOCUMENTS

CA 848899 A 8/1970
CA 3224910 A1 * 12/2022 ............... C05C 1/00
(Continued)

OTHER PUBLICATIONS

Durocher, A. H et al., "The BASF ODDA NPK Process," International Fertilizer Industry Association Technical Conference, Paris, France, Nov. 5-8, 1984, 27 pages.
(Continued)

*Primary Examiner* — Wayne A Langel
(74) *Attorney, Agent, or Firm* — Bradley Arant Boult Cummings LLP; Jessica L. Zurlo

(57) ABSTRACT

The present disclosure provides desensitized fertilizer compositions that are resistant to detonation. The desensitized fertilizer compositions of the present disclosure are formed, under heat, from a reaction product of a base fertilizer material, such as ammonium nitrate, and a phosphate-based additive, such as ammonium polyphosphate. The resulting compositions include monoammonium phosphate (MAP), diammonium phosphate (DAP), and polyphosphate crystals distributed throughout the crystalline fertilizer material. The presence of the distributed MAP and DAP crystals is (Continued)

believed to stabilize the base fertilizer material and reduce or eliminate the detonation potential of the fertilizer material.

15 Claims, 23 Drawing Sheets

(51) Int. Cl.
  *C05C 5/00* (2006.01)
  *C05C 5/02* (2006.01)
  *C05C 5/04* (2006.01)
  *C05G 5/12* (2020.01)

(56) References Cited

U.S. PATENT DOCUMENTS

| | | | | |
|---|---|---|---|---|
| 3,366,468 | A | * | 1/1968 | Porter ................ C05C 1/02 71/36 |
| 3,449,107 | A | * | 6/1969 | Dee .................. C05B 7/00 71/36 |
| 3,630,712 | A | * | 12/1971 | Brown, Jr. ............ C01C 1/18 71/64.12 |
| 3,649,173 | A | * | 3/1972 | Falck-Muss ........... C05C 1/02 71/35 |
| 3,953,192 | A | * | 4/1976 | Hodgson .............. C05G 5/40 149/46 |
| 4,124,368 | A | | 11/1978 | Boyars |
| 6,669,753 | B1 | | 12/2003 | Chambers et al. |
| 6,930,139 | B2 | | 8/2005 | Sanders et al. |
| 7,785,553 | B2 | | 8/2010 | Taulbee |
| 8,075,660 | B2 | | 12/2011 | Kweeder et al. |
| 8,623,315 | B2 | | 1/2014 | Stevens et al. |
| 8,652,277 | B2 | | 2/2014 | Levy et al. |
| 8,721,760 | B2 | | 5/2014 | Kweeder et al. |
| 8,858,673 | B2 | | 10/2014 | Kweeder |
| 9,174,885 | B2 | | 11/2015 | Taulbee |
| 9,328,031 | B2 | | 5/2016 | Ledoux et al. |
| 9,527,779 | B2 | | 12/2016 | Weaver et al. |
| 10,017,428 | B2 | | 7/2018 | Tande et al. |
| 10,351,484 | B2 | | 7/2019 | Weaver et al. |
| 2017/0016664 | A1 | | 1/2017 | Leavitt et al. |
| 2017/0044073 | A1 | | 2/2017 | Ouadday et al. |
| 2018/0370864 | A1 | | 12/2018 | Ledoux |
| 2021/0363070 | A1 | | 11/2021 | Mckinnon et al. |
| 2022/0289641 | A1 | * | 9/2022 | Holt .................. C05G 3/50 |

FOREIGN PATENT DOCUMENTS

| | | | | |
|---|---|---|---|---|
| CN | 1445325 | A | | 10/2003 |
| CN | 1446781 | A | | 10/2003 |
| CN | 1613827 | A | | 5/2005 |
| CN | 1704386 | A | | 12/2005 |
| CN | 101108778 | A | | 1/2008 |
| CN | 101333120 | A | | 12/2008 |
| CN | 101445400 | A | | 6/2009 |
| CN | 101602631 | A | | 12/2009 |
| CN | 101928015 | A | | 12/2010 |
| CN | 102557761 | A | | 7/2012 |
| CN | 103601595 | A | | 2/2014 |
| CN | 104355809 | A | | 2/2015 |
| CN | 104788174 | A | | 7/2015 |
| CN | 105061045 | A | | 11/2015 |
| CN | 105622252 | A | | 6/2016 |
| CN | 109824385 | A | | 5/2019 |
| CN | 109851438 | A | | 6/2019 |
| CN | 110294650 | A | | 10/2019 |
| CN | 110357713 | A | | 10/2019 |
| CN | 110981583 | A | * | 4/2020 ............. C05B 7/00 |
| EP | 1724247 | A1 | * | 11/2006 ............. C05C 9/02 |
| EP | 2091891 | B1 | | 7/2012 |
| FR | 1563784 | A | | 4/1969 |
| GB | 1115071 | | * | 5/1968 ............. B01J 1/02 |
| GB | 1215016 | A | | 12/1970 |
| GB | 1261279 | | * | 1/1972 ............. C05G 1/08 |
| NO | 121789 | B | * | 4/1971 ............. C05C 1/02 |
| WO | WO 2010073238 | A1 | | 7/2010 |
| WO | WO 2017/108801 | A1 | * | 6/2017 ............. C05C 1/02 |
| WO | WO 2022/269252 | A1 | * | 12/2022 ............ C05C 1/00 |

OTHER PUBLICATIONS

International Search Report and Written Opinion dated Oct. 1, 2024 of corresponding International Patent Application No. PCT/US24/30967.

* cited by examiner

DESENSITIZED FERTILIZER COMPOSITIONS AND METHODS OF MAKING SAME

TECHNICAL FIELD

The present invention relates generally to fertilizers, such as nitrate-based fertilizers, and more particularly, to desensitized fertilizer compositions that are resistant to detonation and methods of making the desensitized fertilizer compositions.

BACKGROUND

Ammonium nitrate is a very popular fertilizer in the United States and elsewhere in the world. It is considered one of the best nitrogen fertilizers due to its ammonium and nitrate nitrogen composition. Ammonium nitrate is fast acting, has very low greenhouse gas emissions, and, in many cases, is superior to urea which averages 50 percent nutrient losses. The current worldwide market for ammonium nitrate is approximately $22 billion and growing at an annualized rate of roughly 3 percent. However, due to the significant safety and handling concerns presented by using the popular fertilizer, the growth rate of ammonium nitrate has slowed significantly.

While ammonium nitrate is generally considered a stable chemical, it can be highly explosive and detonate under certain conditions (e.g., in combination with a fuel source). Ammonium nitrate is classified as an oxidizer under the United Nations Recommendations on the Transport of Dangerous Goods, Manual of Tests and Criteria (2019) and will accelerate burning when involved in a fire. Ammonium nitrate itself does not burn, but in contact with other combustible materials it increases fire hazard and supports fire even in the absence of oxygen. When a fire or a heat source is sequestered in a closed container of ammonium nitrate (e.g., tank, shipping container), the reaction can transition to an explosion. Over the past several years, there have been several serious explosions involving ammonium nitrate during its manufacture, shipment, and storage. In one of the world's deadliest industrial accidents, hundreds of people were killed in Texas in 1947 when 2,300 tons of ammonium nitrate detonated aboard a ship. Similar serious explosions recently occurred at a fertilizer plant in West, Texas and inside a port storage building in Beirut, Lebanon. These explosions have shown ammonium nitrate is relatively difficult and potentially hazardous to handle commercially in large amounts, and/or to store in great masses (such as in commercial warehouses and storage bins).

Ammonium nitrate also presents safety and homeland security concerns. While often used for legitimate purposes, malicious actors, such as terrorists, can use ammonium nitrate fertilizer as part of an improvised explosive device. For example, the bombing of the Murrah Federal Building in Oklahoma City, OK, used ammonium nitrate, along with other chemicals, as the primary explosive material. Not surprisingly, due to the associated risks, ammonium nitrate is subject to extensive government regulation by, for instance, the Department of Homeland Security (DHS), the Environmental Protection Agency (EPA), and the Department of Transportation (DOT), as well as subject to increased insurance requirements, which makes it difficult for manufacturers to handle, transport, and sell the popular fertilizer.

Despite ongoing research in both the United States and abroad, no practical method for desensitizing ammonium nitrate has yet been found. A variety of additives have been proposed that would desensitize ammonium nitrate formulations to detonation or severely curtail their explosive performance. However, many additives that have worked well in small scale tests either did not work well in large scale tests, were easily separated, or were environmentally hazardous. For example, while U.S. Pat. No. 3,366,468 to Porter proposes to desensitize ammonium nitrate using 5 to 10 percent ammonium phosphate or a blend of potassium chloride or ammonium sulfate, "desensitized" ammonium nitrate formulations were prepared according to Porter and shown to fail at eliminating the explosiveness of the ammonium nitrate. "Rendering Explosive Materials Inert." National Research Council. 1998. Containing the Threat from Illegal Bombings: An Integrated National Strategy for Marking, Tagging, Rendering Inert, and Licensing Explosives and Their Precursors. Washington, DC: The National Academies Press. doi: 10.17226/5966.

Accordingly, there remains a need in the art for desensitized fertilizer compositions that will not explode or detonate in a pure state, are safe for use as a fertilizer material, and are made from components that are not easily separable from the final product.

SUMMARY

The problems expounded above, as well as others, are addressed by the following inventions, although it is to be understood that not every embodiment of the inventions described herein will address each of the problems described above.

In some embodiments, a desensitized fertilizer product is provided, the desensitized fertilizer product including a fertilizer material including a nitrate group, a plurality of particles distributed throughout the fertilizer material, wherein the particles include monoammonium phosphate, diammonium phosphate, or a combination of the foregoing, wherein the particles are formed, under heat, from a reaction product of the fertilizer material and an additive including an ammonium salt of phosphoric acid, and wherein the additive is present in an amount of about 15 to 70 weight percent based on the total dry weight basis of the desensitized fertilizer product.

In one embodiment, the fertilizer material is selected from the group consisting of ammonium nitrate, ammonium sulfate nitrate, calcium nitrate, potassium nitrate, sodium nitrate, and calcium ammonium nitrate. In another embodiment, the fertilizer material is ammonium nitrate or calcium nitrate. For example, the fertilizer material may be ammonium nitrate. In another embodiment, the additive is present in an amount of about 20 to 50 weight percent based on the total dry weight basis of the desensitized fertilizer product. For instance, the additive may be present in in an amount of about 20 to 40 weight percent based on the total dry weight basis of the desensitized fertilizer product. In still another embodiment, the additive is ammonium polyphosphate, magnesium ammonium phosphate, monoammonium phosphate, diammonium phosphate, or a combination of the foregoing. In yet another embodiment, the additive is a liquid solution of ammonium polyphosphate.

In some embodiments, the ammonium polyphosphate solution has a total nitrogen content as N from about 5 to about 20 weight percent and a total phosphorous content as $P_2O_5$ from about 30 to about 65 weight percent based on the total weight of ammonium polyphosphate solution. In another embodiment, the ammonium polyphosphate solution has a total nitrogen content as N of about 10 weight percent, a total phosphorous content as $P_2O_5$ of about 34 weight percent, and a water content of about 37 weight percent, based on the total weight of ammonium polyphosphate solution. In still another embodiment, the ammonium polyphosphate solution has a total nitrogen content as N of about 11 weight percent, a total phosphorous content as $P_2O_5$ of about 37 weight percent, and a water content of about 32 weight percent, based on the total weight of ammonium polyphosphate solution. In yet another embodiment, the ammonium polyphosphate solution has a total nitrogen content as N of about 15 weight percent, a total phosphorous content as $P_2O_5$ of about 61 weight percent, and a water content of zero weight percent, based on the total weight of ammonium polyphosphate solution. In further embodiments, the particles are present in an amount of about 25 to about 70 weight percent based on the total weight of the desensitized fertilizer product. In still further embodiments, the desensitized fertilizer product may include a plurality of polyphosphate particles distributed throughout the fertilizer material.

In further embodiments, a desensitized fertilizer granule is provided, the desensitized fertilizer granule including ammonium nitrate, a plurality of particles distributed throughout the ammonium nitrate, wherein the particles include monoammonium phosphate, diammonium phosphate, polyphosphate, or combinations of the foregoing, wherein the particles are formed, under heat, from a reaction product of the ammonium nitrate and an additive including ammonium polyphosphate, and wherein the additive is present in an amount of about 15 to 60 weight percent based on the total dry weight basis of the desensitized fertilizer granule.

In one embodiment, the additive is a liquid solution of ammonium polyphosphate. In another embodiment, the ammonium polyphosphate solution has a total nitrogen content as N from about 5 to about 15 weight percent and a total phosphorous content as $P_2O_5$ from about 30 to about 65 weight percent based on the total weight of ammonium polyphosphate solution. In still another embodiment, the ammonium polyphosphate solution has a total nitrogen content as N of about 10 weight percent, a total phosphorous content as $P_2O_5$ of about 34 weight percent, and a water content of about 37 weight percent, based on the total weight of ammonium polyphosphate solution. In yet another embodiment, the ammonium polyphosphate solution has a total nitrogen content as N of about 11 weight percent, a total phosphorous content as $P_2O_5$ of about 37 weight percent, and a water content of about 32 weight percent, based on the total weight of ammonium polyphosphate solution. In another embodiment, the ammonium polyphosphate solution has a total nitrogen content as N of about 15 weight percent, a total phosphorous content as $P_2O_5$ of about 61 weight percent, and a water content of zero weight percent, based on the total weight of ammonium polyphosphate solution.

In some embodiments, the particles include monoammonium phosphate and diammonium phosphate, and the monoammonium phosphate particles are present in the granule in a greater amount than the diammonium phosphate particles. For example, the monoammonium phosphate particles may be present in an amount of about 20 to about 50 weight percent and the diammonium phosphate particles may be present in an amount of about 5 to about 20 weight percent, based on the total weight of the granule. In another embodiment, the additive is present in an amount of about 20 to 40 weight percent based on the total dry weight basis of the desensitized fertilizer granule.

In yet further embodiments, a desensitized fertilizer granule is provided, the granule including a fertilizer material including a nitrate group, a plurality of orthophosphate and polyphosphate particles distributed throughout the fertilizer material, wherein the orthophosphate particles include monoammonium phosphate, diammonium phosphate, ammonium phosphate, and combinations of the foregoing, wherein the particles are formed, under heat, from a reaction product of the fertilizer material and an additive including an ammonium salt of phosphoric acid, and wherein the additive is present in an amount of about 15 to 60 weight percent based on the total dry weight basis of the desensitized fertilizer granule.

In one embodiment, the fertilizer material is selected from the group consisting of ammonium nitrate, ammonium sulfate nitrate, calcium nitrate, potassium nitrate, sodium nitrate, and calcium ammonium nitrate. In another embodiment, the fertilizer material is ammonium nitrate or calcium nitrate. For instance, the fertilizer material is ammonium nitrate. In yet another embodiment, the additive is present in an amount of about 20 to 50 weight percent based on the total dry weight basis of the desensitized fertilizer product. In another embodiment, the additive is present in in an amount of about 20 to 40 weight percent based on the total dry weight basis of the desensitized fertilizer product. In yet another embodiment, the additive is ammonium polyphosphate, magnesium ammonium phosphate, monoammonium phosphate, diammonium phosphate, or a combination of the foregoing. In some embodiments, the additive is a liquid solution of ammonium polyphosphate.

In still further embodiments, a method of making a desensitized fertilizer granule is provided, the method including forming a melt including a fertilizer material and an additive, wherein the fertilizer material includes a nitrate group and the additive includes an ammonium salt of phosphoric acid, heating the melt to form a concentrated melt including a water content of about 3 percent or less, and granulating the concentrated melt to produce a desensitized fertilizer granule, wherein the additive is present in an amount of about 15 to 70 weight percent based on the total dry weight basis of the desensitized fertilizer granule.

In one embodiment, the concentrated melt includes a water content of about 2 percent or less. In another embodiment, the melt is stirred until the melt reaches a temperature of at least about 275° F. In still another embodiment, the additive is ammonium polyphosphate, magnesium ammonium phosphate, monoammonium phosphate, diammonium phosphate, or a combination of the foregoing. In yet another embodiment, the additive is a liquid solution of ammonium polyphosphate. In some embodiments, the ammonium polyphosphate solution has a total nitrogen content as N from about 5 to about 15 weight percent and a total phosphorous content as $P_2O_5$ from about 30 to about 65 weight percent based on the total weight of ammonium polyphosphate solution. In another embodiment, the desensitized fertilizer granule includes a plurality of particles distributed throughout the fertilizer material, and wherein the particles include monoammonium phosphate, diammonium phosphate, ammonium phosphate, polyphosphate, or combinations of the foregoing. In yet another embodiment, the fertilizer material is selected from the group consisting of ammonium nitrate, ammonium sulfate nitrate, calcium nitrate, potassium nitrate, sodium nitrate, and calcium ammonium nitrate.

In yet further embodiments, a method of making a desensitized fertilizer granule is provided, the method including forming a first melt including an additive, wherein the additive includes an ammonium salt of phosphoric acid and the first melt includes a water content of about 3 percent or less, forming a second melt including a fertilizer material including a nitrate group, adding the first melt to the second melt to form a mixture, and granulating the mixture to produce a desensitized fertilizer granule, wherein the additive is present in an amount of about 15 to 60 weight percent based on the total dry weight basis of the desensitized fertilizer granule.

In some embodiments, the first melt includes a water content of about 1 percent or less. In another embodiment, the first melt is heated to a temperature of at least about 250° F. In still another embodiment, the additive is ammonium polyphosphate, magnesium ammonium phosphate, monoammonium phosphate, diammonium phosphate, or a combination of the foregoing. In yet another embodiment, the additive is a liquid solution of ammonium polyphosphate. For instance, the ammonium polyphosphate solution may have a total nitrogen content as N from about 5 to about 15 weight percent and a total phosphorous content as $P_2O_5$ from about 30 to about 65 weight percent based on the total weight of ammonium polyphosphate solution. In another embodiment, the desensitized fertilizer granule includes a plurality of particles distributed throughout the fertilizer material, and wherein the particles include monoammonium phosphate, diammonium phosphate, ammonium phosphate, polyphosphate, or combinations of the foregoing. In still another embodiment, the fertilizer material is selected from the group consisting of ammonium nitrate, ammonium sulfate nitrate, calcium nitrate, potassium nitrate, sodium nitrate, and calcium ammonium nitrate.

In further embodiments, a method of making a desensitized fertilizer granule is provided, the method including reacting superphosphoric acid and ammonia under heat to form an ammonium polyphosphate melt, combining the ammonium polyphosphate melt with a fertilizer material to form a mixture, wherein the fertilizer material includes a nitrate group, and granulating the mixture to produce a desensitized fertilizer granule, wherein the desensitized fertilizer granule includes a plurality of particles distributed throughout the fertilizer material, and wherein the particles include monoammonium phosphate, diammonium phosphate, ammonium phosphate, polyphosphate, or combinations of the foregoing. In one embodiment, the ammonium polyphosphate melt has a total nitrogen content as N of about 15 weight percent and a total phosphorous content as $P_2O_5$ of about 61 weight percent based on the total weight of ammonium polyphosphate melt. In another embodiment, the method further includes heating the fertilizer material prior to combining with the ammonium polyphosphate melt.

In still further embodiments, a method of increasing the availability of phosphorus and/or nitrogen for plant uptake from soil is provided, the method including introducing into the soil any of the desensitized fertilizer products or desensitized fertilizer granules described above, to release for plant uptake the phosphorus and/or nitrogen.

BRIEF DESCRIPTION OF THE DRAWINGS

Further features and advantages can be ascertained from the following detailed description that is provided in connection with the drawings described below.

DETAILED DESCRIPTION

Figure 1:
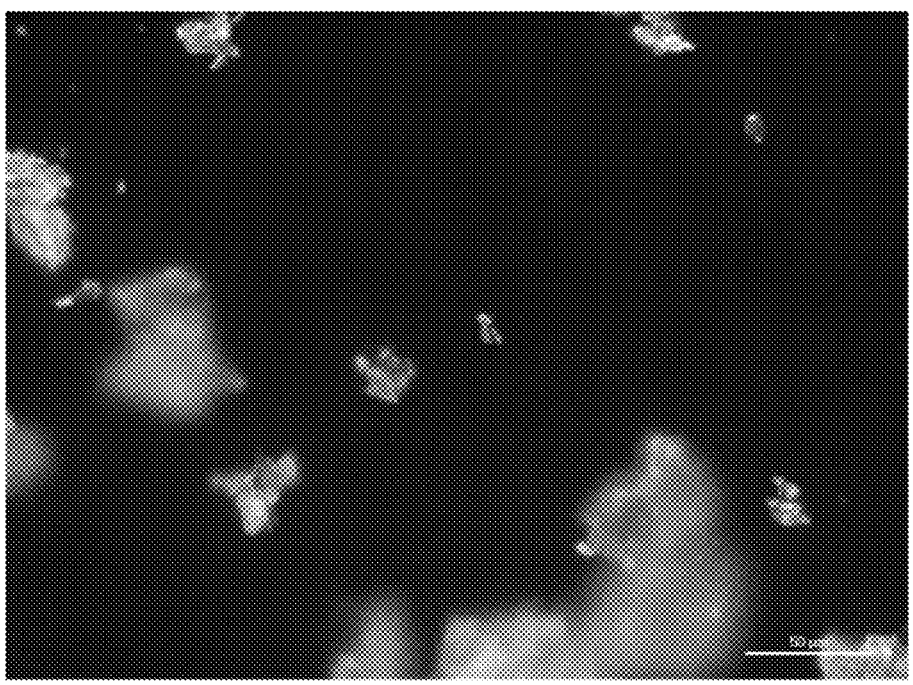
FIG. 1 is a polarized light microscopy (PLM) image of aggregated and isolated crystalline material from an inventive composition (Inventive Sample 1) prepared in accordance with the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural (i.e., "at least one") forms as well, unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

Desensitized Fertilizer Compositions

The present disclosure provides desensitized fertilizer compositions that are resistant to detonation. The desensitized fertilizer compositions of the present disclosure are formed by combining a base fertilizer material with a phosphate-based additive, for example, a polyphosphate. Without being bound by any particular theory, it is believed that, when the phosphate-based additive is combined and concentrated with molten fertilizer material, the polyphosphate component of the additive converts to short chain orthophosphate particles, for example, in the form of mono-ammonium phosphate (MAP), diammonium phosphate (DAP), and/or ammonium phosphate, and polyphosphate particles. During the melt process, micron and/or submicron-sized MAP, DAP, ammonium phosphate, and/or polyphosphate crystals are formed and distributed throughout the crystalline fertilizer material. The resulting product (for example, a granular fertilizer) is a homogenous blend of orthophosphate crystals (for example, MAP, DAP, and ammonium phosphate) and/or polyphosphate crystals distributed in the fertilizer-based particles. The presence of the distributed orthophosphate and/or polyphosphate crystals is believed to stabilize the base fertilizer material and reduce or eliminate the detonation potential of the fertilizer material. In some embodiments, the orthophosphate crystals and/or the polyphosphate crystals may be uniformly distributed throughout the crystalline fertilizer material. For example, the desensitized fertilizer compositions may include a sufficient amount of fertilizer crystals bound to an orthophosphate and/or polyphosphate particle to minimize the amount of free nitrate in the compositions and prevent separation or isolation of the fertilizer crystals from the orthophosphate/polyphosphate particles.

In some embodiments, the base fertilizer material may be any fertilizer material having explosivity or detonation potential. In one embodiment, the base fertilizer material may be a nitrate fertilizer. That is, a fertilizer material containing a nitrate group. Examples of nitrate fertilizers include, but are not limited to, ammonium nitrate, ammonium sulfate nitrate, calcium nitrate, potassium nitrate, sodium nitrate, and calcium ammonium nitrate. In another embodiment, the base fertilizer material may be a nitrate-based N-P-K (nitrogen-phosphorus-potassium) fertilizer. In still another embodiment, the base fertilizer material may be a nitrate-based N-P (nitrogen-phosphorous) fertilizer. In yet another embodiment, the base fertilizer material may be a nitrate-based N-K (nitrogen-potassium) fertilizer.

In one embodiment, due to its known detonation capabilities and the need for desensitization, the base fertilizer material is ammonium nitrate. Ammonium nitrate has a chemical formula of $NH_4NO_3$ and is a crystalline salt consisting of ions of ammonium and nitrate. Ammonium nitrate is highly soluble in water. As the term is used herein, "ammonium nitrate" is intended to mean and encompass within its scope ammonium nitrate in any of its forms, including as free ammonium nitrate and ammonium nitrate in the form of any one of the salts. In one embodiment, the ammonium nitrate has a nitrogen content between about 33 percent and 35 percent. In some embodiments, the present disclosure contemplates the use of ammonium nitrate in a solid form. In this embodiment, ammonium nitrate can be produced by reacting ammonia gas with nitric acid to form a concentrated solution. The solution can be further concentrated to remove excess water until a melt containing about 95 to 99.7 percent ammonium nitrate is produced. For example, the solution can be further concentrated to remove excess water until a melt containing about 97 to 99 percent ammonium nitrate is produced. This melt can be granulated or prilled to produce a solid ammonium nitrate product, such as a granular fertilizer.

The base fertilizer material may be used in an amount of about 40 weight percent to about 80 weight percent, based on the total weight of the composition. In another embodiment, the base fertilizer may be used in an amount of about 50 weight percent to about 70 weight percent, based on the total weight of the composition. In still another embodiment, the base fertilizer may be used in an amount of about 55 weight percent to about 60 weight percent, based on the total weight of the composition. For example, the base fertilizer may be used in an amount of about 60 weight percent, based on the total weight of the composition. In another embodiment, the base fertilizer may be used in an amount of about 70 weight percent, based on the total weight of the composition. In still another embodiment, the base fertilizer may be used in an amount of about 80 weight percent, based on the total weight of the composition.

The additive of the present disclosure may be a phosphate-based additive. In some embodiments, the additive is a polyphosphate. The term, "polyphosphate," as used herein refers to a linear chain polymer containing at least two tetrahedral $PO_4$ structural units linked together by shared oxygen atoms. The simplest polyphosphate is a pyrophosphate formed by sharing of oxygens between two tetrahedral $PO_4$ groups. A triphosphate is formed by sharing of oxygens between three tetrahedral $PO_4$ groups. Longer chain polyphosphates may contain upwards of hundreds to thousands of tetrahedral $PO_4$ structural units linked together by shared oxygen atoms.

In some embodiments, the additive is an ammonium polyphosphate-based additive. That is, the additive is an inorganic salt of polyphosphoric acid and ammonia, i.e., ammonium polyphosphate. Ammonium polyphosphate has a chemical formula of $[NH_4PO_3]_n(OH)_2$ and the following structure:

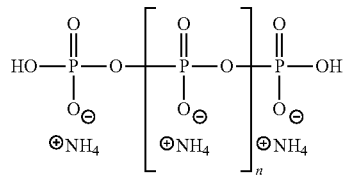

As shown above, each monomer of ammonium polyphosphate includes an orthophosphate radical of a phosphorus atom with three oxygens and one negative charge neutralized by an ammonium cation, leaving two bonds free to polymerize. In some embodiments, the ammonium polyphosphate may have a chain length where n is equal to or greater than 100. In further embodiments, the ammonium polyphosphate may have a chain length where n is equal to or greater than 1000.

In one embodiment, the ammonium polyphosphate may have a total nitrogen content as N from about 5 to about 20 weight percent based on the total weight of ammonium polyphosphate. In another embodiment, the ammonium polyphosphate may have a total nitrogen content as N from about 5 to about 15 weight percent based on the total weight of ammonium polyphosphate. In another embodiment, the ammonium polyphosphate may have a total nitrogen content as N from about 10 to about 12 weight percent based on the total weight of ammonium polyphosphate. For instance, the ammonium polyphosphate may have a total nitrogen content as N of about 10 weight percent based on the total weight of ammonium polyphosphate. As another example, the ammonium polyphosphate may have a total nitrogen content as N of about 11 weight percent based on the total weight of ammonium polyphosphate. As a further example, the ammonium polyphosphate may have a total nitrogen content as N of about 15 weight percent based on the total weight of ammonium polyphosphate.

In further embodiments, the ammonium polyphosphate may have a total phosphorous content as $P_2O_5$ from about 30 to about 65 weight percent based on the total weight of ammonium polyphosphate. In another embodiment, the ammonium polyphosphate may have a total phosphorous content as $P_2O_5$ from about 30 to about 50 weight percent based on the total weight of ammonium polyphosphate. In still another embodiment, the ammonium polyphosphate may have a total phosphorous content as $P_2O_5$ from about 30 to about 40 weight percent based on the total weight of ammonium polyphosphate. In another embodiment, the ammonium polyphosphate may have a total phosphorous content as $P_2O_5$ from about 34 to about 38 weight percent based on the total weight of ammonium polyphosphate. For instance, the ammonium polyphosphate may have a total phosphorous content as $P_2O_5$ of about 34 weight percent based on the total weight of ammonium polyphosphate. As another example, the ammonium polyphosphate may have a total phosphorous content as $P_2O_5$ of about 37 weight percent based on the total weight of ammonium polyphosphate. As a further example, the ammonium polyphosphate may have a total phosphorous content as $P_2O_5$ of about 61 weight percent based on the total weight of ammonium polyphosphate.

In some embodiments, the ammonium polyphosphate has a water content of about 25 to about 50 weight percent based on the total weight of ammonium polyphosphate. In one embodiment, the ammonium polyphosphate has a water content of about 30 to about 40 weight percent based on the total weight of ammonium polyphosphate. In another embodiment, the ammonium polyphosphate has a water content of about 32 to about 37 weight percent based on the total weight of ammonium polyphosphate. For example, the ammonium polyphosphate may have a water content of about 32 weight percent based on the total weight of ammonium polyphosphate. As another example, the ammonium polyphosphate may have a water content of about 37 weight percent based on the total weight of ammonium polyphosphate. In still further embodiments, the ammonium polyphosphate may have a water content of zero. This dispenses of the need to concentrate the ammonium polyphosphate to remove excess water prior to combining with the base fertilizer material.

In one embodiment, the ammonium polyphosphate may have a total nitrogen content as N of about 10 weight percent, a total phosphorous content as $P_2O_5$ of about 34 weight percent, and a water content of about 37 weight percent, based on the total weight of ammonium polyphosphate. In another embodiment, the ammonium polyphosphate may have a total nitrogen content as N of about 11 weight percent, a total phosphorous content as $P_2O_5$ of about 37 weight percent, and a water content of about 32 weight percent, based on the total weight of ammonium polyphosphate. In still another embodiment, the ammonium polyphosphate may have a total nitrogen content as N of about 15 weight percent, a total phosphorous content as P$_2$O$_5$ of about 61 weight percent, and a water content of zero weight percent. In some embodiments, the ammonium polyphosphate may be composed of about 70 percent polyphosphate and 30 percent orthophosphate.

In some embodiments, the present disclosure contemplates the use of a liquid solution of the polyphosphate-based additive. For example, a liquid solution of ammonium polyphosphate may be used in accordance with the present disclosure. A solution of ammonium polyphosphate may be produced by reacting super phosphoric acid and anhydrous ammonia. The ammonium polyphosphate solution is water soluble. The ammonium polyphosphate is also completely soluble in ammonium nitrate. In some embodiments, the ammonium polyphosphate solution has a pH from about 5.5 to about 6.5. For example, the ammonium polyphosphate solution may have a pH of about 6.0. In further embodiments, the polyphosphate-based additive may be used in solid form. For instance, solid ammonium polyphosphate may be used in accordance with the present disclosure.

In further embodiments, the phosphate-based additive may include salts of phosphoric acid and ammonia. In one embodiment, the phosphate-based additive may be monoammonium phosphate (MAP). In another embodiment, the phosphate-based additive may be diammonium phosphate (DAP). In still further embodiments, the phosphate-based additive may include MAP and DAP. For example, the additive may be a liquid solution of MAP and DAP.

In still further embodiments, the phosphate-based additive of the present disclosure may be magnesium ammonium phosphate (MgNH$_4$PO$_4$·6H$_2$O) (also known as struvite). Magnesium ammonium phosphate may be produced when phosphorus and nitrogen, commonly found at a wastewater treatment plant, are reacted with a source of magnesium. Struvite crystals precipitate when magnesium, ammonia, and phosphate are combined in water at a mole ratio of 1:1:1. In one embodiment, the magnesium ammonium phosphate may be used in solid form, such as crystalline form. In another embodiment, the magnesium ammonium phosphate may be used in liquid form. For example, a solution of magnesium ammonium phosphate may be formed by reacting a solution containing phosphorous and ammonia with magnesium.

In yet further embodiments, the additive may be potassium chloride, ammonium sulfate, or a combination thereof. The potassium chloride and/or ammonium sulfate may be used in place of the additives described above. In other embodiments, the potassium chloride and/or ammonium sulfate may be used in combination with any of the other additives described above.

The additive may be used in an amount effective to substantially reduce or eliminate the detonation sensitivity of the fertilizer material. In one embodiment, the additive may be used in an amount of about 15 weight percent to about 70 weight percent, based on the total weight (dry basis) of the composition. In another embodiment, the additive may be used in an amount of about 15 weight percent to about 60 weight percent, based on the total weight (dry basis) of the composition. In another embodiment, the additive may be used in an amount of about 20 weight percent to about 50 weight percent, based on the total weight (dry basis) of the composition. In still another embodiment, the additive may be used in an amount of about 20 weight percent to about 40 weight percent, based on the total weight (dry basis) of the composition. In another embodiment, the additive may be used in an amount of about 30 weight percent to about 40 weight percent, based on the total weight (dry basis) of the composition. In yet another embodiment, the additive may be used in an amount of about 20 weight percent, based on the total weight (dry basis) of the composition. In another embodiment, the additive may be used in an amount of about 30 weight percent, based on the total weight (dry basis) of the composition. In still another embodiment, the additive may be used in an amount of about 40 weight percent, based on the total weight (dry basis) of the composition.

The present disclosure provides desensitized fertilizer compositions including the reaction product formed by combining the base fertilizer materials and the additives, such as the phosphate-based additives. As described above, during the melt concentration (heating) process, the polyphosphate component of the additive is decomposed into micron and/or submicron-sized orthophosphate and/or polyphosphate crystals bound to the fertilizer particles. In some embodiments, the reaction product includes a plurality of orthophosphate particles, such as orthophosphate crystals, and a plurality of polyphosphate particles distributed throughout the crystalline structure of the base fertilizer material. As used herein, "orthophosphate particles" refer to particles containing only one phosphate group while "polyphosphate particles" refer to particles containing at least two tetrahedral PO$_4$ structural units linked together by shared oxygen atoms. Without being bound by any particular theory, it is believed that the orthophosphate particles and the polyphosphate particles are distributed throughout the crystal lattice of the fertilizer material. The distribution (e.g., uniform distribution) of the orthophosphate particles and/or the polyphosphate particles throughout the crystalline structure of the fertilizer and the water-soluble nature of both the fertilizer and the orthophosphate/polyphosphate particles (as well as the size, non-porous nature, and concentration of the orthophosphate/polyphosphate particles) render it difficult to separate or isolate the fertilizer crystals from the orthophosphate/polyphosphate particles. In some embodiments, the resulting reaction product is resistant to isolation by mechanical disaggregation techniques. The inability to separate the components of the fertilizer composition increases the safety of the fertilizer compositions during subsequent handling, shipment, and storage of the fertilizer and inhibits malicious actors from using the fertilizer in explosive devices.

Due to the high level of homogeneity of orthophosphate and polyphosphate particles in the crystalline structure of the fertilizer, the resulting reaction product has minimal to no free nitrate. In some embodiments, the resulting reaction product has less than 5 percent free nitrate. In another embodiment, resulting reaction product has less than 3 percent free nitrate. In still another embodiment, the resulting reaction product has less than 1 percent free nitrate. In yet another embodiment, the resulting reaction product has less than 0.5 percent free nitrate. In further embodiments, the resulting reaction product has no free nitrate.

The use of the polyphosphate component of the present disclosure is advantageous in that the reaction eliminates the need for a powder form of the phosphate-based additive (such as grinding powders, handling powders, metering powders, or mixing powders). It is believed that a powder form of the phosphate-based additive would not result in the micron and sub-micron-sized orthophosphate and polyphosphate particles of the present disclosure or the high level of homogeneity due to the inability to grind the powder to micron and sub-micron crystal particle sizes.

In one embodiment, the orthophosphate particles are in the form of monoammonium phosphate (MAP) particles, diammonium phosphate (DAP) particles, ammonium phosphate particles, or combinations thereof. For example, the reaction product may include a plurality of monoammonium phosphate particles and diammonium phosphate particles distributed throughout the crystalline structure of the base fertilizer material. In one embodiment, the reaction product may include a plurality of monoammonium phosphate particles and diammonium phosphate particles distributed throughout the crystalline structure of ammonium nitrate. In some embodiments, the reaction product may also include minor amounts of a phosphate compound that does not have the crystalline properties of MAP or DAP. For instance, the reaction product may include a plurality of ammonium phosphate particles in addition to a plurality of monoammonium phosphate particles and diammonium phosphate particles. In still further embodiments, the reaction product may include a combination of polyphosphate particles and orthophosphate particles. For instance, in embodiments where it may not be necessary to concentrate the ammonium polyphosphate prior to combining with the base fertilizer material, the ammonium polyphosphate can be combined with the base fertilizer material without significant degradation and the reaction product may include both polyphosphate particles and orthophosphate particles.

It is believed that the orthophosphate particles, such as monoammonium phosphate, diammonium phosphate, and ammonium phosphate, act as flame retardants in the desensitized fertilizer compositions. The orthophosphate particles release phosphoric acid byproducts and hydrates that reduce fire propagation and release water vapor during heat decomposition to bring about cooling. Layers of phosphoric acid byproducts are formed on the burning surface which cuts off air and extinguishes the fire. Indeed, the phosphoric acid byproducts act as a catalyst in the dehydration of carbon-based poly-alcohols, such as cellulose in wood, by producing carbonaceous char rather than flammable gases. The resultant carbonaceous char helps to shield the underlying polymer from attack by oxygen and radiant heat therefore preventing the pyrolysis of the substrate.

The orthophosphate and polyphosphate particles may be micron or sub-micron sized. In one embodiment, the orthophosphate and polyphosphate particles have a particle size of about 500 µm or less. In another embodiment, the orthophosphate and polyphosphate particles have a particle size of about 100 µm or less. In still another embodiment, the orthophosphate and polyphosphate particles have a particle size of about 50 µm or less. In yet another embodiment, the orthophosphate and polyphosphate particles have a particle size of about 10 µm or less. In some embodiments, the orthophosphate and polyphosphate particles have a particle size of about 2 µm or less. In another embodiment, the orthophosphate and polyphosphate particles have a particle size of about 1.5 µm or less. In still another embodiment, the orthophosphate and polyphosphate particles have a particle size of about 1 µm or less. In yet another embodiment, the orthophosphate and polyphosphate particles have a particle size of less than 1 µm. In some embodiments, the orthophosphate and polyphosphate particles may have a particle size ranging from about 1 µm to about 500 µm. In another embodiment, the orthophosphate and polyphosphate particles may have a particle size ranging from about 1 µm to about 100 µm.

The total amount of orthophosphate and/or polyphosphate particles present in the reaction product may vary depending on the concentration and type of phosphate-based additive utilized in the composition. Different phosphate-based additives are composed of various phosphate chain lengths of orthophosphates and polyphosphates. This results in the reaction product having varying concentrations of orthophosphate and polyphosphate particles homogeneously distributed throughout the fertilizer material.

In some embodiments, the reaction product may include the orthophosphate particles in an amount of about 25 to about 70 weight percent based on the total weight of the reaction product. In another embodiment, the reaction product may include the orthophosphate particles in an amount of about 30 to about 65 weight percent based on the total weight of the reaction product. In still another embodiment, the reaction product may include the orthophosphate particles in an amount of about 35 to about 60 weight percent based on the total weight of the reaction product. In yet another embodiment, the reaction product may include the orthophosphate particles in an amount of about 40 to about 55 weight percent based on the total weight of the reaction product.

In some embodiments, the monoammonium phosphate particles are present in the reaction product in a greater amount than the diammonium phosphate particles. In one embodiment, the monoammonium phosphate particles may be present in an amount greater than about 20 weight percent while the diammonium phosphate particles may be present in an amount less than about 20 weight percent, based on the total weight of the reaction product. For example, the monoammonium phosphate particles may be present in an amount of about 20 to about 50 weight percent while the diammonium phosphate particles may be present in an amount of about 5 to about 20 weight percent, based on the total weight of the reaction product. In some embodiments, the weight percent ratio of monoammonium phosphate particles to diammonium phosphate particles ranges from about 4:1 to 10:1.

The resulting reaction product may have a total nitrogen content as N from about 20 weight percent to about 40 weight percent, based on the total weight of the final reaction product. In another embodiment, the resulting reaction product may have a total nitrogen content as N from about 25 weight percent to about 35 weight percent, based on the total weight of the final reaction product. In still another embodiment, the resulting reaction product may have a total nitrogen content as N from about 25 weight percent to about 32 weight percent, based on the total weight of the final reaction product. In further embodiments, the resulting reaction product may have a total phosphorous content as $P_2O_5$ of about 1 weight percent to about 30 weight percent, based on the total weight of the final reaction product. In another embodiment, the resulting reaction product may have a total phosphorous content as $P_2O_5$ of about 3 weight percent to about 25 weight percent, based on the total weight of the final reaction product. In still another embodiment, the resulting reaction product may have a total phosphorous content as $P_2O_5$ of about 5 weight percent to about 24 weight percent, based on the total weight of the final reaction product.

The desensitized fertilizer compositions of the present disclosure are resistant to detonation. In some embodiments, the desensitized fertilizer compositions are not sensitive to detonative shock as tested in accordance with Test Series 2 Gap Test of the United Nations Recommendations on the Transport of Dangerous Goods, Manual of Tests and Criteria, 2019. In another embodiment, the desensitized fertilizer compositions showed no violent effect on heating under confinement as tested in accordance with Test Series 1 and Series 2 Koenen Tests of the United Nations Recommendations on the Transport of Dangerous Goods, Manual of Tests and Criteria, 2019. In still further embodiments, the desensitized fertilizer compositions showed no or slow deflagration as tested in accordance with Test Series 1 and Series 2 Time/Pressure Test of the United Nations Recommendations on the Transport of Dangerous Goods, Manual of Tests and Criteria, 2019. In yet further embodiments, the desensitized fertilizer compositions are not cap sensitive, as measured in accordance with the (#8) Cap Sensitivity Test. In still another embodiment, the desensitized fertilizer compositions are not shock sensitive, as tested in accordance with the U.N. Test 1 (a): U.N. Gap Test.

The desensitized fertilizer compositions are also resistant to propagating detonation when mixed with fuel. For example, the desensitized fertilizer compositions did not propagate a detonation when mixed with diesel fuel. Without being bound by any particular theory, it is believed that the minimal amount of water in the composition combined with its non-porous and homogenous nature may attribute to the resistance to detonation. For example, the desensitized fertilizer compositions did not absorb fuel oil even after the compositions were saturated with the highest concentrated fuel oil mixture for a period of over 12 hours, which is likely due to the non-porous and homogenous nature of the compositions. In addition, the improved hardness and low abrasion resistance/degradation of granules formed with the desensitized fertilizer compositions is believed to also attribute to resisting propagation of detonation.

Due to the desensitized nature of the fertilizer compositions, the compositions of the present disclosure are not considered hazardous materials. For example, in some embodiments, the compositions of the present disclosure are not considered hazardous materials under Title 49 of the Code of Federal Regulations, "Transportation", Part 172, "Hazardous Materials Table." In further embodiments, the fertilizer compositions of the present disclosure are not classified as oxidizers. For instance, the fertilizer compositions are not classified as oxidizers under United Nations Recommendations on the Transport of Dangerous Goods, Manual of Tests and Criteria, 2019, "Section 34, Classification Procedures, Test Methods and Criteria Relating to Oxidizing Substances of Division 5.1." Hence the desensitized fertilizer compositions of the present disclosure do not require "oxidizer" labeling.

Moreover, the desensitized fertilizer compositions of the present disclosure are environmentally friendly when utilized for their intended purpose as a fertilizer. For example, the fertilizer compositions are believed to display a lower overall carbon footprint than known, commercially prepared and available fertilizers. In addition, the fertilizer compositions of the present disclosure have an added benefit in that they contain sufficient amounts of both nitrogen and phosphorous to benefit a wide variety of plants and crops (as opposed to only nitrogen in ammonium nitrate). In this embodiment, the fertilizer compositions of the present disclosure have increased amounts of phosphorus and/or nitrogen available for uptake by plants from the soil and can be used to increase the health, growth rates, and yields of plants. In addition, the pH of the soil environment around the fertilizer compositions of the present disclosure is about 3.5 to 4.5, which improves the uptake of phosphorous and/or nitrogen.

The desensitized fertilizer compositions also have advantageous critical relative humidity (CRH) values. CRH is the relative humidity (at a given temperature) above which a fertilizer readily absorbs moisture from the atmosphere, and below which it will not absorb atmospheric moisture. In general, the higher the CRH, the less likely the fertilizer is to absorb moisture and the better the storage characteristics. In some embodiments, the desensitized fertilizer compositions have a CRH of about 55 percent to about 65 percent, which is higher than the CRH of ammonium nitrate. The increase in CRH of the desensitized fertilizer compositions means there is less of a chance for moisture to collect on/absorb into the surface of the composition and evaporate causing pores and dust to form on the surface of desensitized fertilizer compositions.

In some embodiments, the desensitized fertilizer compositions also have improved hardness when compared to ammonium nitrate. For instance, when formed into granules, the desensitized fertilizer compositions may have a hardness ranging from about 8 pounds/granule to about 16 pounds/granule. In another embodiment, when formed into granules, the desensitized fertilizer compositions may have a hardness ranging from about 10 pounds/granule to about 15 pounds/granule. In still another embodiment, when formed into granules, the desensitized fertilizer compositions may have a hardness ranging from about 11 pounds/granule to about 13 pounds/granule. In yet another embodiment, when formed into granules, the desensitized fertilizer compositions may have a hardness ranging from about 11 pounds/granule to about 12 pounds/granule. The increased granule hardness may correlate to the low surface porosity and the distributed granule crystal matrix.

In further embodiments, when formed into granules, the desensitized fertilizer compositions have low granule attrition. For example, in one embodiment, the granule abrasion resistance or degradation of the desensitized fertilizer compositions may range from about 0.01 percent to about 0.1 percent fines. In another embodiment, the granule abrasion resistance or degradation of the desensitized fertilizer compositions may range from about 0.02 percent to about 0.08 percent fines. In still another embodiment, the granule abrasion resistance or degradation of the desensitized fertilizer compositions may range from about 0.03 percent to about 0.05 percent fines. The low dust generation and degradation is another indication that the desensitized fertilizer compositions are not porous or friable on the surface. In this embodiment, the crystal phase change for phase III to phase IV is believed to occur at a higher temperature for the desensitized fertilizer compositions when compared to the phase change temperatures of traditional ammonium nitrate fertilizers.

Methods of Making the Desensitized Fertilizer Compositions

The present disclosure also provides methods of making the desensitized fertilizer compositions described above. The methods of the present disclosure involve mixing the base fertilizer material and the additive under sufficient heat to initiate a polymerization reaction between the fertilizer compound and the polyphosphate chain of the additive. In some embodiments, due to the moisture content of the additive, the methods involve heating the additive until a threshold concentration is reached to remove excess water. In one embodiment, the fertilizer material and the additive may be combined and heated together to form a melt. In other embodiments, the fertilizer material and the additive may be heated separately and then combined to form a melt.

The methods of the present disclosure include forming a melt of the base fertilizer material and the additive. In one embodiment, the melt may be formed by combining the base fertilizer material and the additive to form a mixture. The base fertilizer material may be provided in solid form. For example, the base fertilizer material may be provided as a prill. In another embodiment, the base fertilizer material may be added as a solution. In still another embodiment, the base fertilizer material may be added as a melt. The additive can be provided in liquid form. The base fertilizer material and the additive can be used in any of the amounts discussed above.

Once the base fertilizer material and the additive are combined, the mixture is heated to remove excess water and concentrate the melt of fertilizer material and additive. The mixture may be concentrated by passing the solution through a concentrator. For example, the mixture may be concentrated by passing the solution through a wiped film or falling film evaporator or a heated agitated vessel. In some embodiments, the mixture is heated until the melt reaches a certain temperature threshold or concentration threshold. In further embodiments, the mixture is heated until the melt reaches both a certain temperature threshold and a concentration threshold. Once the mixture reaches the temperature and/or concentration threshold, the concentrated melt is formed and can be removed from the heat.

The mixture may be heated until the melt reaches a threshold concentration to remove excess water. In one embodiment, the mixture may be heated until the melt is concentrated to at least about 95 percent (and has a moisture content of about 5 percent or less). In another embodiment, the mixture may be heated until the melt is concentrated to at least about 97 percent (and has a moisture content of about 3 percent or less). In still another embodiment, the mixture may be heated until the melt is concentrated to at least about 98 percent (and has a moisture content of about 2 percent or less). In another embodiment, the mixture may be heated until the melt is concentrated to at least about 99 percent (and has a moisture content of about 1 percent or less).

In further embodiments, the mixture may be heated until the melt reaches a certain temperature threshold. In this embodiment, the mixture may be heated until the melt reaches a temperature of at least about 275° F. In another embodiment, the mixture may be heated until the melt reaches a temperature of at least about 280° F. In still another embodiment, the mixture may be heated until the melt reaches a temperature of at least about 284° F. In yet another embodiment, the mixture may be heated until the melt reaches a temperature of at least about 290° F.

In another embodiment of the methods of the present disclosure, the melt may be formed by heating the base fertilizer material and the additive separately and then mixing the heated components to form the melt. In this embodiment, the additive is heated until it reaches a certain temperature threshold or concentration threshold to remove excess water prior to mixing with the fertilizer material. The base fertilizer material may be heated until it reaches a molten state. Once the fertilizer material reaches a molten state and the additive reaches the temperature and/or concentration threshold, the molten fertilizer material and the heated additive can be mixed with stirring to form the concentrated melt.

In some embodiments, the additive is heated until it reaches a threshold concentration to remove excess water. In one embodiment, the additive may be heated until it is concentrated to at least about 95 percent (and has a moisture content of about 5 percent or less). In another embodiment, the additive may be heated until it is concentrated to at least about 97 percent (and has a moisture content of about 3 percent or less). In yet another embodiment, the additive may be heated until it is concentrated to at least about 98 percent (and has a moisture content of about 2 percent or less). In still another embodiment, the mixture may be heated until it is concentrated to at least about 99 percent (and has a moisture content of about 1 percent or less). In yet another embodiment, the mixture may be heated until it is concentrated to at least about 99.5 percent (and has a moisture content of about 0.5 percent or less).

In further embodiments, the additive is heated until it reaches a certain temperature threshold. In one embodiment, the additive is heated until it reaches its boiling point. In another embodiment, the additive is heated until it reaches a temperature of at least about 225° F. In still another embodiment, the additive is heated until it reaches a temperature of at least about 240° F. In yet another embodiment, the additive is heated until it reaches a temperature of at least about 250° F. In still another embodiment, the additive is heated until it reaches a temperature of at least about 260° F. In another embodiment, the additive is heated until it reaches a temperature of at least about 275° F.

The fertilizer material may be heated until it reaches a molten state. The temperature to which the fertilizer material may be heated will vary depending on the composition of the fertilizer. In one embodiment, the fertilizer material is ammonium nitrate. In this embodiment, the ammonium nitrate can be heated to a temperature of at least about 337° F. to reach a molten state.

In some embodiments of the methods of the present disclosure, it may not be necessary to concentrate the additive prior to combining with the fertilizer material to form the melt. For example, in embodiments where the additive contains a low moisture content or no excess water, the additive can be added directly to the base fertilizer material without reaching a certain concentration threshold. In this embodiment, the additive may be heated prior to combining with the molten base fertilizer material such that the molten additive is combined with the molten fertilizer material. In other embodiments, the additive may be heated at the same time as the base fertilizer material to form a melt of the additive and base fertilizer material. For instance, in embodiments where the additive is ammonium polyphosphate having a water content of zero percent, the ammonium polyphosphate can be made by reacting superphosphoric acid with ammonia under moderate pressure at an elevated temperature and the resultant melt can be added directly to the molten fertilizer material without concentrating the additive beforehand.

The molten mixture of the additive and base fertilizer material is formed as a melt. In some embodiments, the melt produced is free of solids, clear to light green in color, and has the appearance of a pure molten material free of crystal particles. After the melt is formed, the melt is produced into a desensitized fertilizer product. The resulting product includes a plurality of orthophosphate particles, for example, in the form of monoammonium phosphate (MAP), diammonium phosphate (DAP), and ammonium phosphate, and polyphosphate particles that are distributed and bound to the crystalline structure of the fertilizer compound. It is believed that the orthophosphate particles act as a flame or fire retardant in desensitizing the fertilizer material to detonation.

In one embodiment, the melt is granulated to produce a desensitized fertilizer granule. The melt may be granulated using a pan granulator. In this embodiment, the melt is applied to undersized particles of the fertilizer material and the additive. Successive layers of the melt are added to the particles, forming granules. In another embodiment, the melt may be granulated using a rotary drum granulator or a fluidized bed. Rotary drum work by tumbling material in a rotating drum to encourage granule formation and growth. The tumbling results in spherically round and polished fertilizer granules. In still other embodiments, the melt can be formed into prills using methods known in the art. For example, the melt can be prilled or prill fattened.

When the desensitized fertilizer product is formed into granules, the granules can be removed from the granulator and screened for consistently sized granules. In some embodiments, the granules can be separated into oversized granules, product granules, and undersized granules. Oversized granules refer to granules having a particle size greater than about 4 mm. Product granules refer to granules having a particle size of about 2 mm to about 4 mm. Undersized granules refer to granules having a particle size of less than about 2 mm. The oversized granules can be ground to reduce the particle size and the ground oversize can be returned to the granulator and recycled to supply additional particles. The undersized granules can be returned directly to the granulator. The product granules are collected and dried to remove any residual moisture. The product granules may also undergo further drying and cooling to reduce caking in storage and produce a high crush strength to reduce degradation from product handling.

EXAMPLES

The following non-limiting examples demonstrate desensitized fertilizer compositions that may be made in accordance with the present disclosure. The examples are merely illustrative of the preferred embodiments of the present disclosure and are not to be construed as limiting the disclosure, the scope of which is defined by the appended claims.

Example 1: Preparation of Inventive and Comparative Fertilizer Compositions

Inventive and comparative samples of fertilizer compositions were prepared in accordance with the methods of the present disclosure. Inventive Samples 1-3 and Comparative Samples 5-7 were prepared using method 1 outlined below, and Inventive Sample 4 was prepared using method 2 outlined below. The formulations of each of the prepared samples are shown in Table 1 below.

TABLE 1

Formulations of Inventive and Comparative Fertilizer Compositions

| Sample | Fertilizer | Additive | Additive (%) | Fertilizer (%) |
|---|---|---|---|---|
| Inventive Sample 1 | Ammonium nitrate prill | Liquid Ammonium polyphosphate (11-37-0) | 20 | 80 |
| Inventive Sample 2 | Ammonium nitrate prill | Liquid Ammonium polyphosphate (11-37-0) | 30 | 70 |
| Inventive Sample 3 | Ammonium nitrate prill | Liquid Ammonium polyphosphate (11-34-0) | 40 | 60 |
| Inventive Sample 4 | Ammonium nitrate prill | Liquid concentrate Ammonium polyphosphate (11-34-0) | 30 | 70 |
| Comparative Sample 5 | Ammonium nitrate prill | Ammonium polyphosphate powder | 35 | 65 |
| Comparative Sample 6 | Ammonium nitrate prill | Ground monoammonium phosphate (MAP) | 30.5 | 69.5 |
| Comparative Sample 7 | Ammonium nitrate prill | Ground diammonium phosphate (DAP) | 30.5 | 69.5 |

Method 1: Additive is Combined with Fertilizer and Mixture is Concentrated Prior to Granulation According to method 1, a pre-determined amount of the fertilizer and additive were combined at room temperature. The mixture was heated and continuously stirred on a hotplate to remove water and concentrate the melt. The mixture was continuously heated and stirred until the melt reached a temperature of 284° F. (at this point approximately 2 percent moisture remained in the mixture). Once the molten fertilizer/additive melt was concentrated to approximately 98 percent, the mixture was removed from the heat and granulated using a bench scale rotary pan granulator. The solidified granules were continuously produced by applying melt onto a rolling bed of fertilizer/additive undersized particles. As particles continued to increase in size they were constantly removed from the pan and screened, using lab sieves, to separate the fertilizer into oversized granules, product granules, and undersized granules. The oversized granules (i.e., particles greater than 4 mm in size) were ground using a conventional coffee grinder to reduce the particle size. The ground oversize was returned to the granulator as recycle. The undersized granules (i.e., particles less than 2 mm in size) obtained during the screening operation were returned to the granulator. The product granules (i.e., particles between 2-4 mm in size) were collected and dried further to remove any residual moisture. The product was cooled to room temperature and packaged.

Method 2: Additive is Concentrated Prior to being Added to Molten Fertilizer

According to method 2, a pre-determined amount of the additive was placed in a beaker and heated to a boil. The liquid additive was concentrated until approximately less than 1 percent of the moisture remained. The temperature of the liquid was 250° F. A pre-determined amount of fertilizer was weighed and transferred to a beaker and heated to approximately 337° F. to melt. The molten additive melt was combined to the molten fertilizer and stirred continuously. Once the mixture was thoroughly mixed, the molten material was granulated in a laboratory pan granulator. Solidified granules were continuously produced by applying melt onto a rolling bed of fertilizer/additive undersized particles. As particles continued to increase in size they were constantly removed from the pan and screened, using lab sieves, to separate the fertilizer into oversized granules, product granules, and undersized granules. The oversized granules (i.e., particles greater than 4 mm in size) were ground using a conventional coffee grinder to reduce the particle size. The ground oversize was returned to the granulator as recycle. The undersized granules (i.e., particles less than 2 mm in size) obtained during the screening operation were returned to the granulator. The product granules (i.e., particles between 2-4 mm in size) were collected and dried further to remove any residual moisture. The product was cooled to room temperature and packaged.

Example 2: Chemical and Crystal Analysis of Inventive and Comparative Fertilizer Compositions X-Ray Diffraction
Methods X-ray diffraction was used to determine the types of ammonium phosphate compounds formed in Inventive Samples 1-3. The samples were prepared for x-ray diffraction analysis and scanned over a range of 3° to 60° 2θ Cu Kα radiation, 40 kV, 25 mA. Mineral phases were identified with the aid of computer-assisted programs accessing a powder diffraction database. Estimates of mineral concentrations are based on relative peak heights and reference intensity ratios (RIR) measured in-house.

Results

A significant amount of monoammonium phosphate (MAP) was detected in all three samples (Inventive Samples 1-3). A "significant" amount was defined as 21 to 50 percent by weight, based on the total weight percentage of the sample. A minor amount of diammonium phosphate (DAP) was detected in all three of the samples (Inventive Samples 1-3). A "minor" amount was defined as 5 to 20 percent by weight, based on the total weight percentage of the sample.

Nuclear Magnetic Resonance (NMR)
Methods

NMR was used to determine the presence of ortho and polyphosphates in Inventive Samples 1-3.

Results

All samples analyzed (Inventive Samples 1-3) produced spectra having a large peak at 1 ppm corresponding to orthophosphate. As such, Inventive Samples 1-3 contained orthophosphate (the traditional form of phosphate found in MAP and DAP) and not polyphosphate.

Polarized Light Microscopy (PLM) Crystallography & Scanning Electron Microscopy (SEM)
Methods PLM crystallography and SEM evaluations were used to identify compounds that were produced when the liquid additive was combined with the ammonium nitrate fertilizer at various concentrations and granulated to solid fertilizer (Inventive Samples 1-3). PLM crystallography and SEM evaluations were also used to analyze the crystalline structure of Comparative Samples 5-7.

Preliminary examinations were conducted using an Olympus SZ40 stereomicroscope. Representative subsamples of material were analyzed by polarized light microscopy (PLM), scanning electron microscopy-energy dispersive x-ray spectrometry (SEM-EDS) and confocal Raman microscopy (CRM). PLM analysis was performed using Olympus BHSP and aus Jena Jenapol polarized light microscopes. SEM-EDS analysis was conducted with a JEOL JSM-6490LV scanning electron microscope coupled to a Thermo Scientific Noran System 7 energy dispersive x-ray spectrometry system. CRM analysis was performed using a WITec alpha300R confocal Raman microscope.

A microchemical test to confirm the presence of ammonium ($NH_4^+$) was conducted on Inventive Sample 1. The test consists of the addition of a drop of NaOH to a small subsample on a microscope slide. If $NH_4^+$ is present, ammonia gas ($NH_3$) is expelled by gentle warming of the preparation and is "fixed" by a hanging drop of dilute HCl placed on a separate microscope slide that is suspended above the sample on a glass cell. A positive result is obtained by the formation of octahedral crystals of ammonium chloroplatinate upon the addition of chloroplatinic acid reagent to the hanging drop. Representative subsamples of material were dry ground and ethanol ground using an agate mortar and pestle in an attempt to isolate various phases for analysis. A portion of Inventive Sample 3 was dissolved in deionized water, and the dried crystalline precipitate was analyzed by PLM and CRM.

Results

Inventive Samples 1, 2, and 3 had a uniform distribution of micron and sub-micron sized MAP and DAP crystals throughout the crystalline matrix. The samples appeared to be homogeneous throughout and featured tightly compacted crystalline material that is generally resistant to isolation by mechanical disaggregation. Elongated crystals exhibiting optical properties consistent with MAP were present in each sample. A significant portion of each sample was soluble in ethanol which is consistent with ammonium nitrate (moderately soluble in ethanol), and ammonium nitrate was confirmed by CRM analysis in all samples. SEM-EDS analysis indicated all three samples (Inventive Samples 1, 2, and 3) to consist primarily of particulate that exhibited composition consistent with ammonium phosphate. Furthermore, PLM examination of particulate ground in ethanol with a mortar and pestle from all three samples (Inventive Samples 1, 2, and 3) indicated a large proportion of acicular to elongated crystals that exhibited optical properties consistent with MAP, suggesting that MAP is likely the dominant pure ammonium phosphate phase present in the samples.

Figure 2:
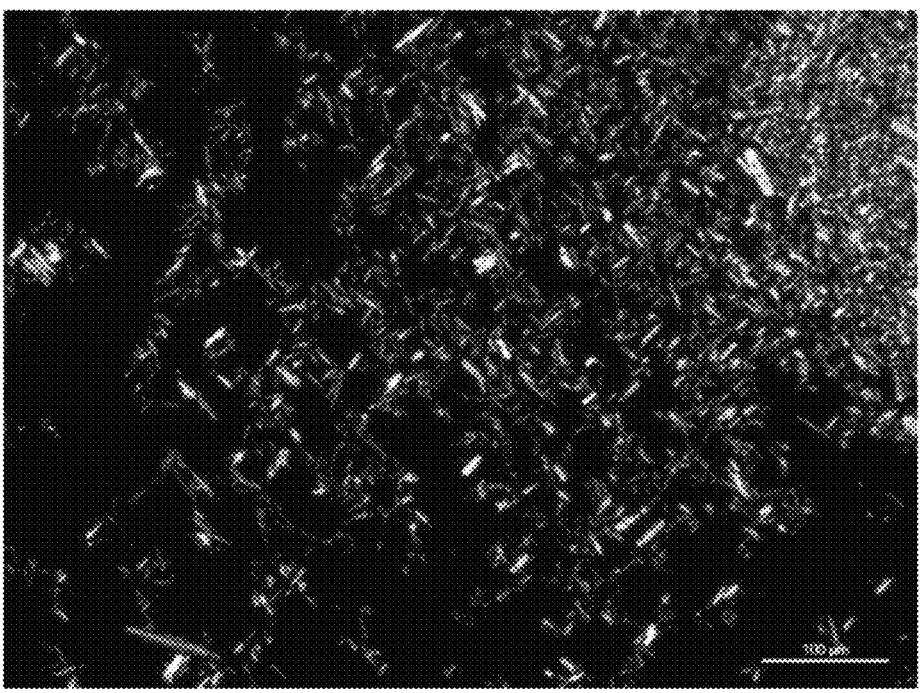
FIG. 2 is a PLM image of crystals from Inventive Sample 1 prepared in accordance with the present disclosure.
Figure 3:
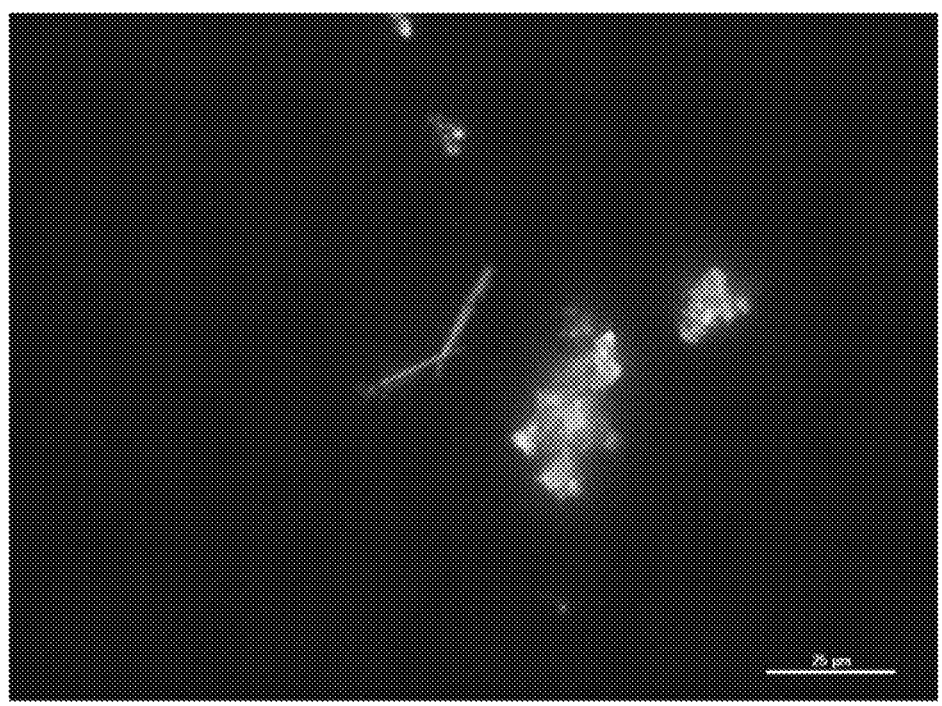
FIG. 3 is a PLM image of aggregated and isolated crystalline material from an inventive composition (Inventive Sample 2) prepared in accordance with the present disclosure.
Figure 4:
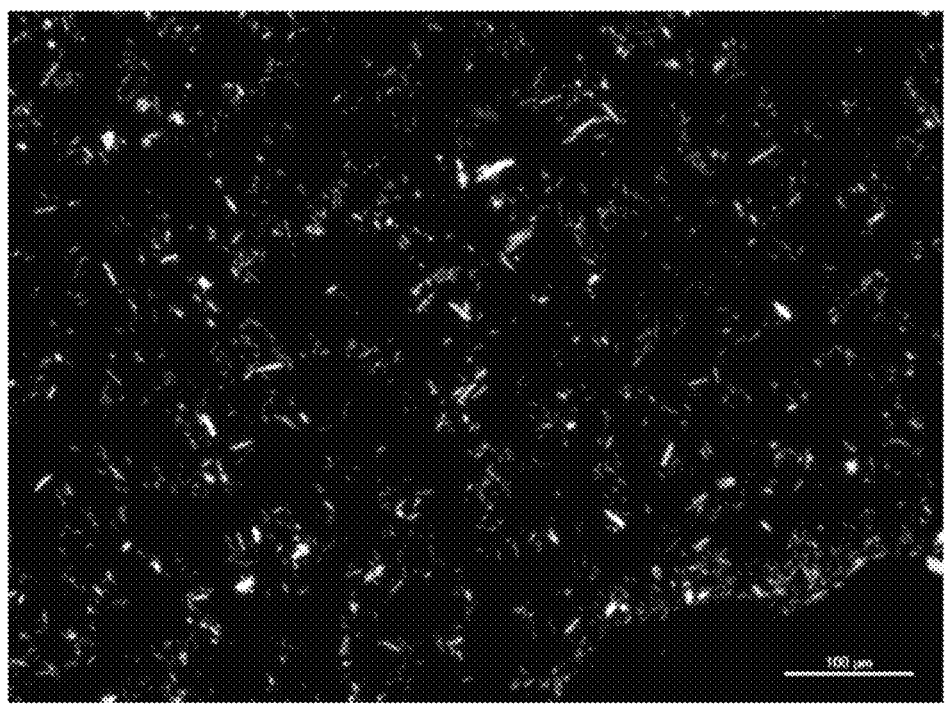
FIG. 4 is a PLM image of crystals from Inventive Sample 2 prepared in accordance with the present disclosure.
Figure 5:
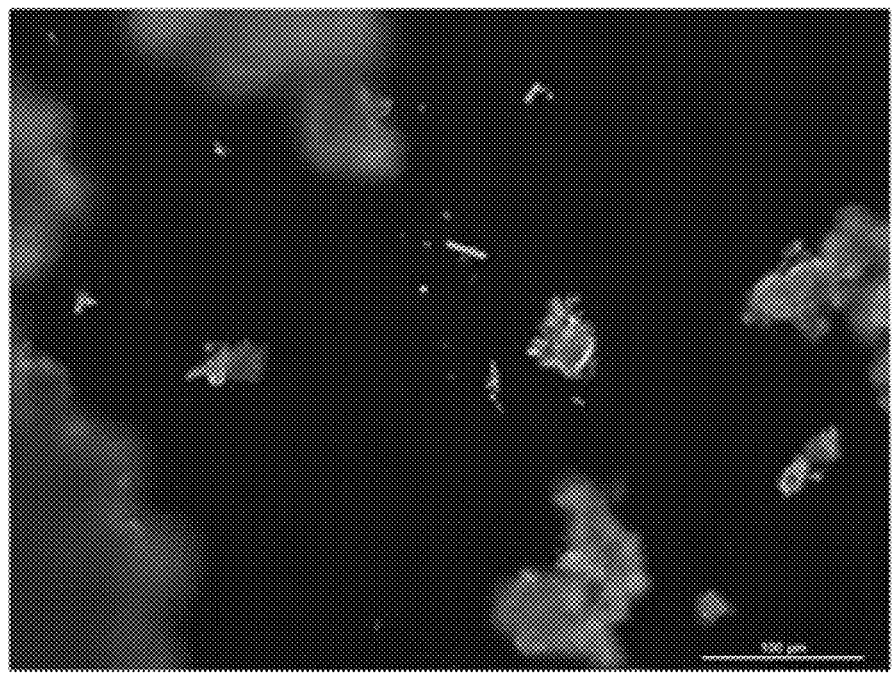
FIG. 5 is a PLM image of aggregated and isolated crystalline material from an inventive composition (Inventive Sample 3) prepared in accordance with the present disclosure.
Figure 6:
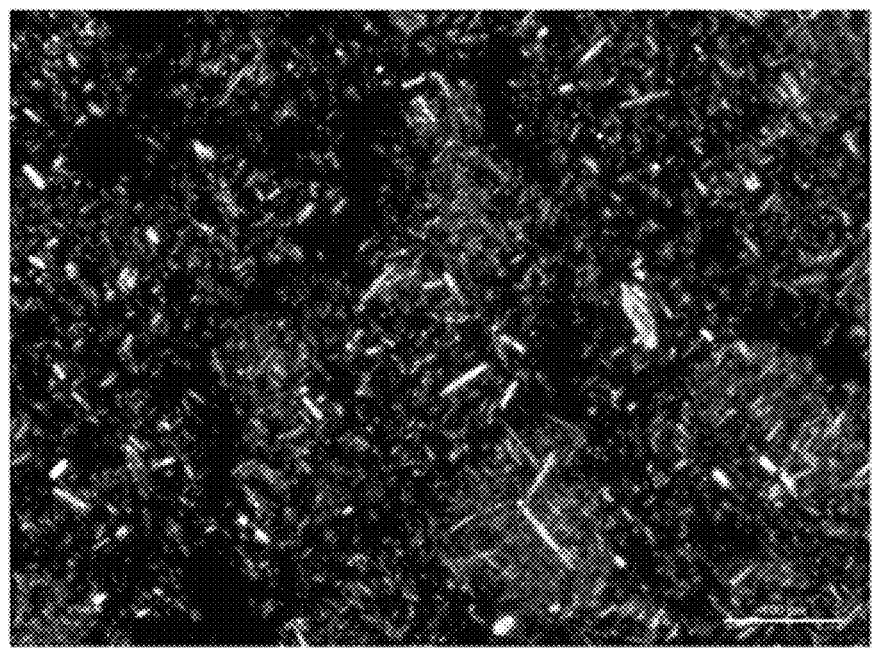
FIG. 6 is a PLM image of crystals from Inventive Sample 3 prepared in accordance with the present disclosure.

FIGS. 1 and 2 show aggregated and isolated crystals from Inventive Sample 1 that are consistent with MAP. FIGS. 3 and 4 show aggregated and isolated crystals from Inventive Sample 2. FIGS. 5 and 6 show aggregated and isolated crystals from Inventive Sample 3. As shown in FIGS. 1, 3, and 5, elongated crystals exhibiting parallel extinction, first order gray to white interference colors, negative sign of elongation, and refractive indices consistent with MAP were present in each of Inventive Samples 1-3. FIGS. 2, 4, and 6 show the PLM examination of the sample material ground in a mortar and pestle in the presence of ethanol. As shown in FIGS. 2, 4, and 6, the resulting material of each of Inventive Samples 1-3 was a residue composed almost entirely of elongated acicular to prismatic crystals that exhibited properties consistent with MAP.

Figure 7:
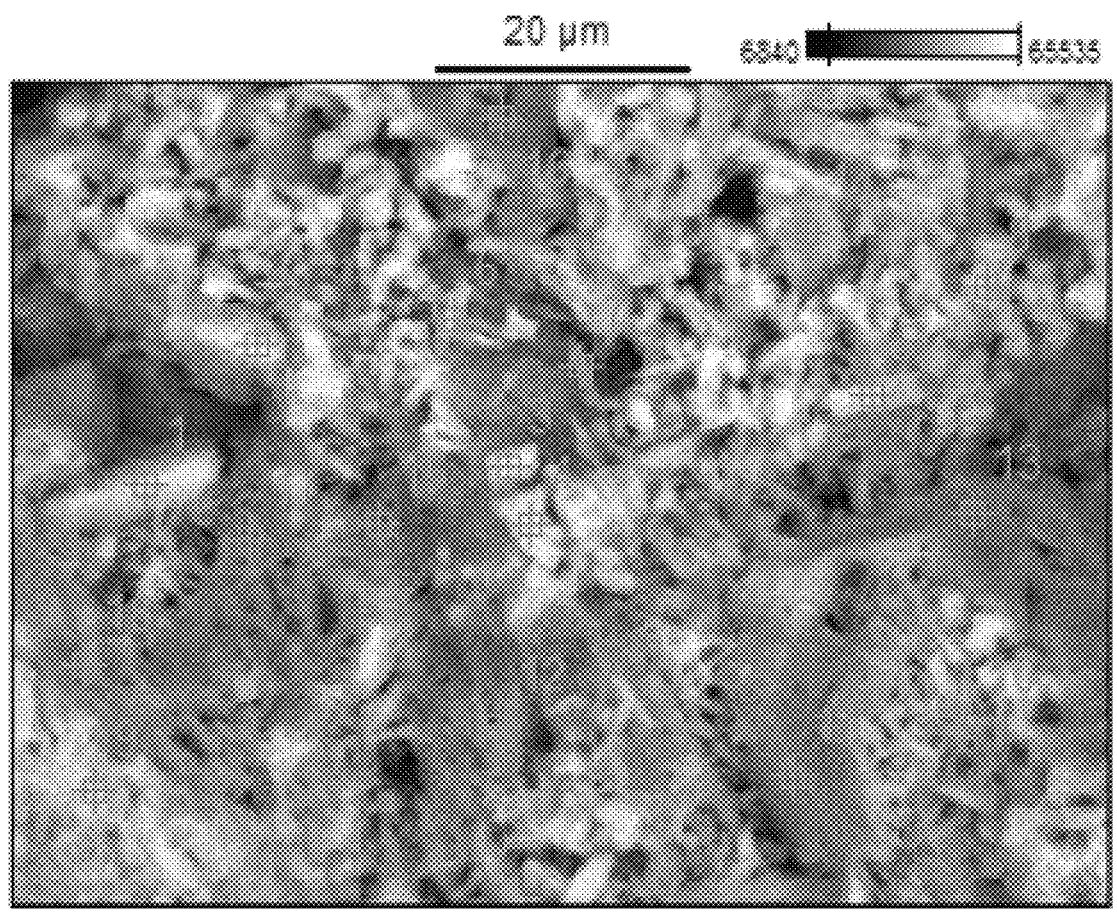
FIG. 7 is a backscattered electron image of particulate from Inventive Sample 3 prepared in accordance with the present disclosure.
Figure 8:
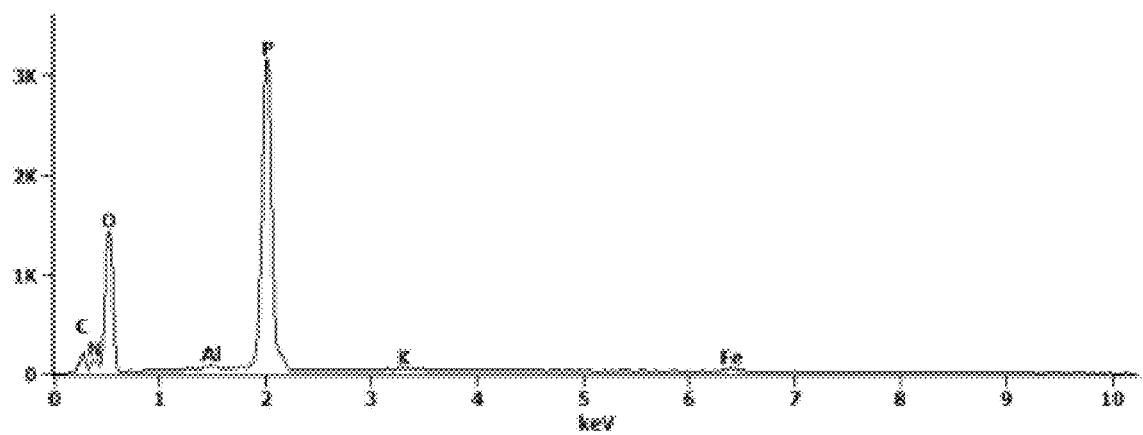
FIG. 8 is an EDS spectrum obtained for location 1 shown in FIG. 7.
Figure 9:
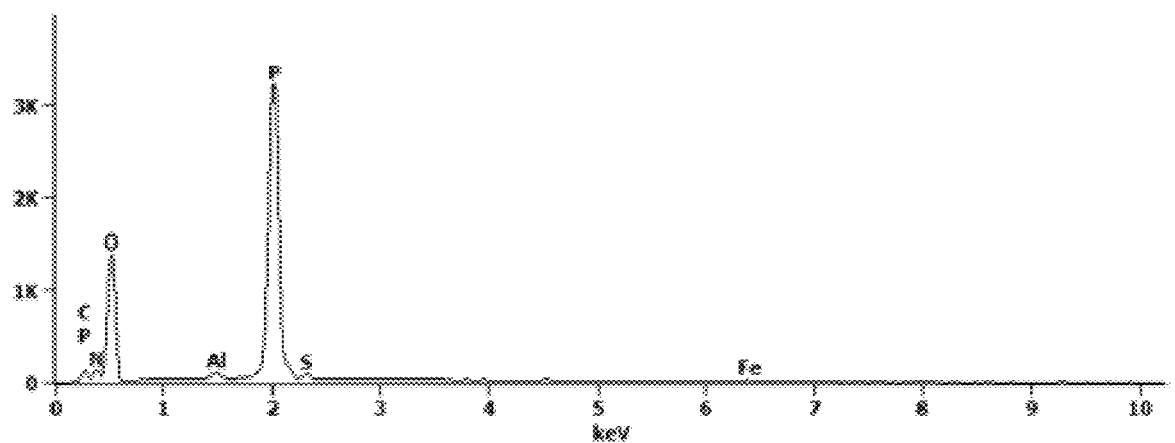
FIG. 9 is an EDS spectrum obtained for location 2 shown in FIG. 7.
Figure 10:
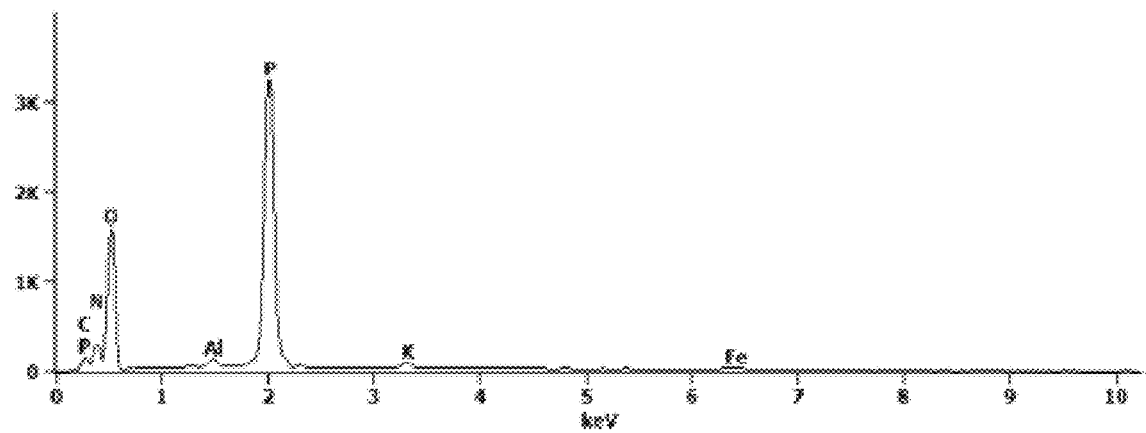
FIG. 10 is an EDS spectrum obtained for location 3 shown in FIG. 7.
Figure 11:
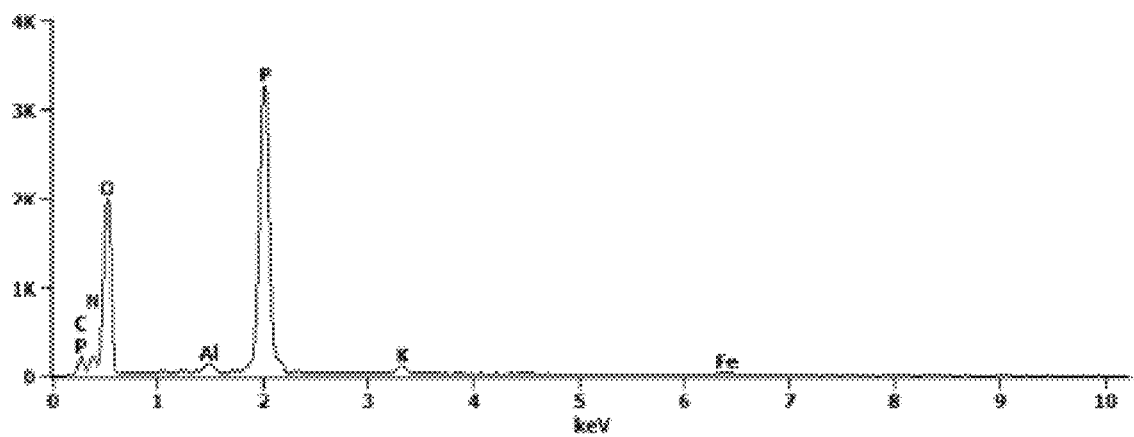
FIG. 11 is an EDS spectrum obtained for location 4 shown in FIG. 7.
Figure 12:
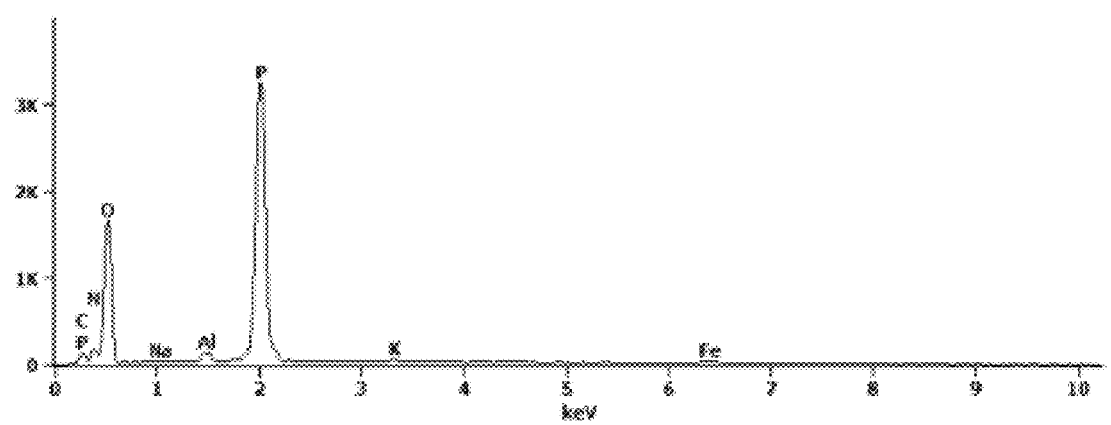
FIG. 12 is an EDS spectrum obtained for location 5 shown in FIG. 7.
Figure 13:
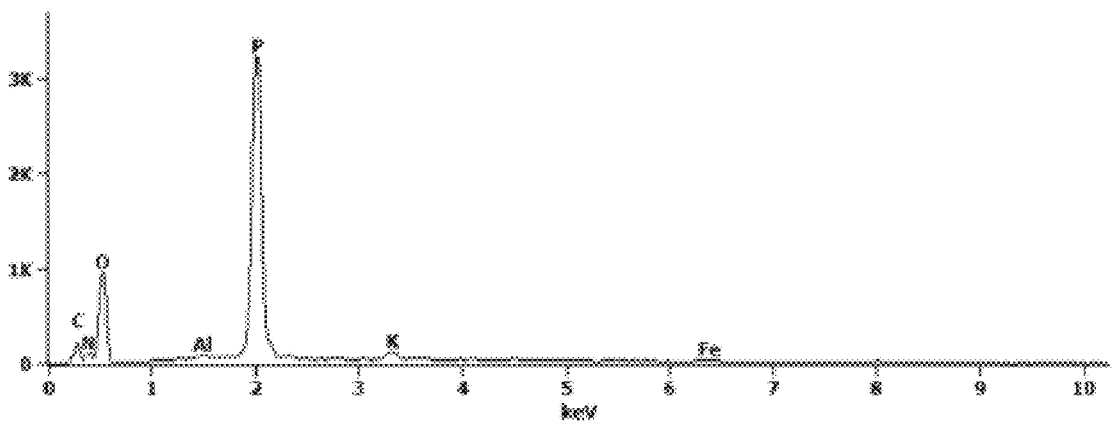
FIG. 13 is an EDS spectrum obtained for location 6 shown in FIG. 7.
Figure 14:
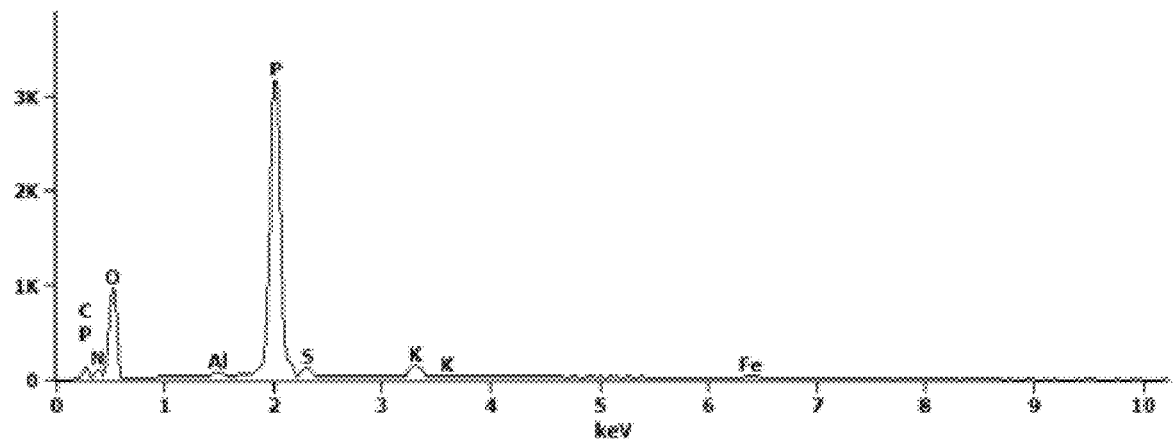
FIG. 14 is an EDS spectrum obtained for location 7 shown in FIG. 7.
Figure 15:
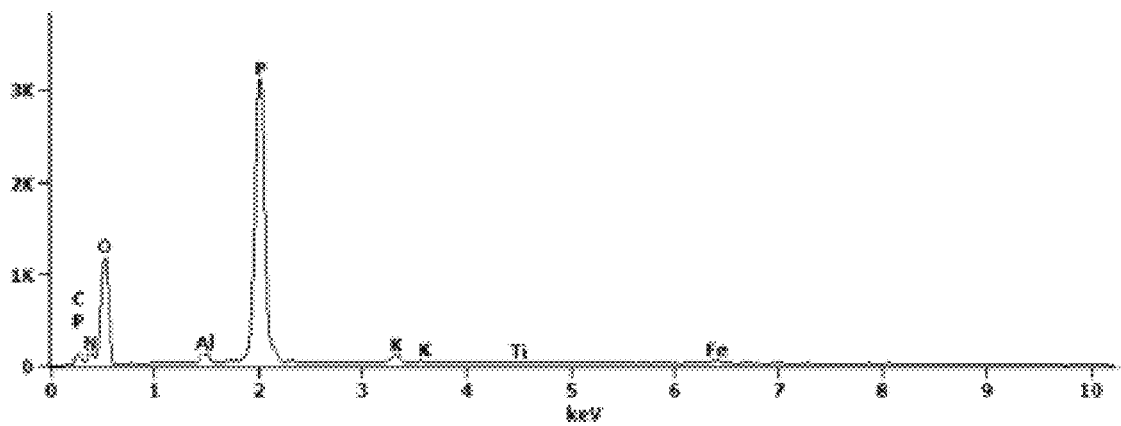
FIG. 15 is an EDS spectrum obtained for location 8 shown in FIG. 7.
Figure 16:
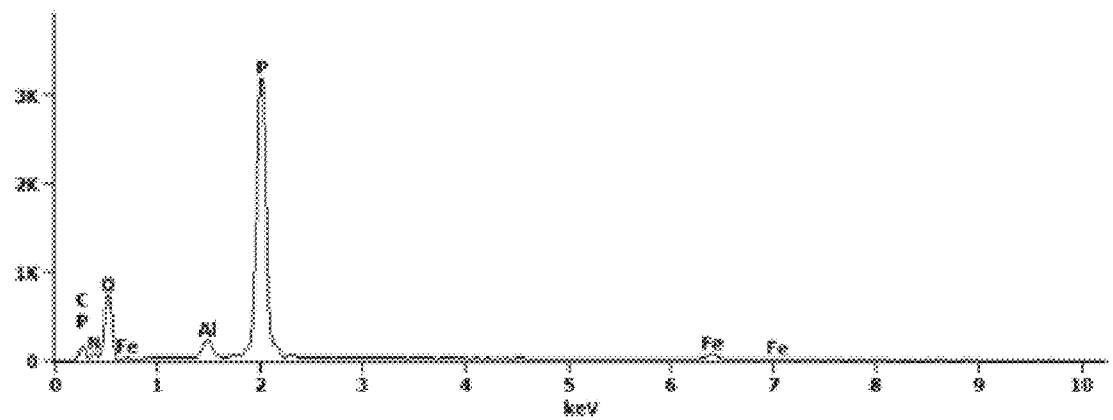
FIG. 16 is an EDS spectrum obtained for location 9 shown in FIG. 7.
Figure 17:
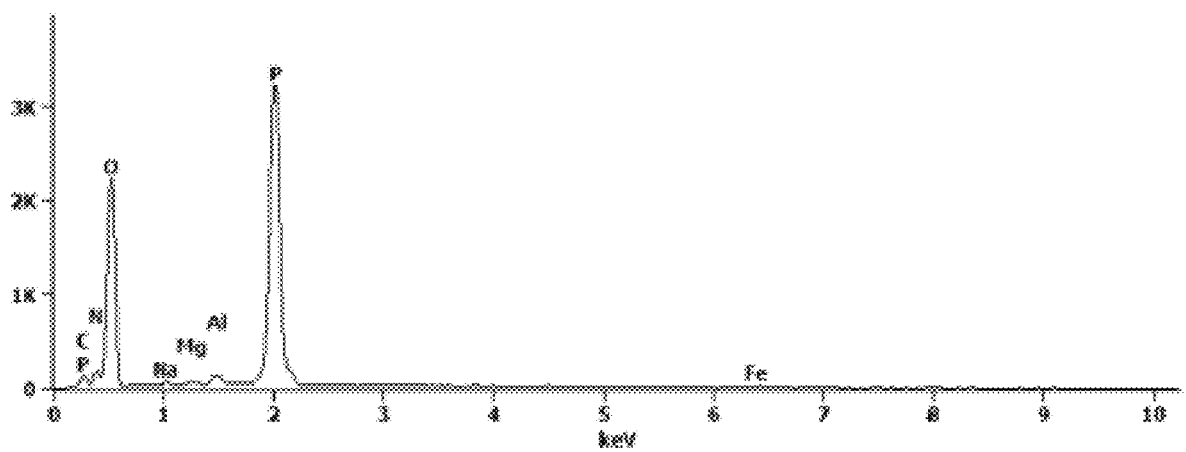
FIG. 17 is an EDS spectrum obtained for location 10 shown in FIG. 7.
Figure 18:
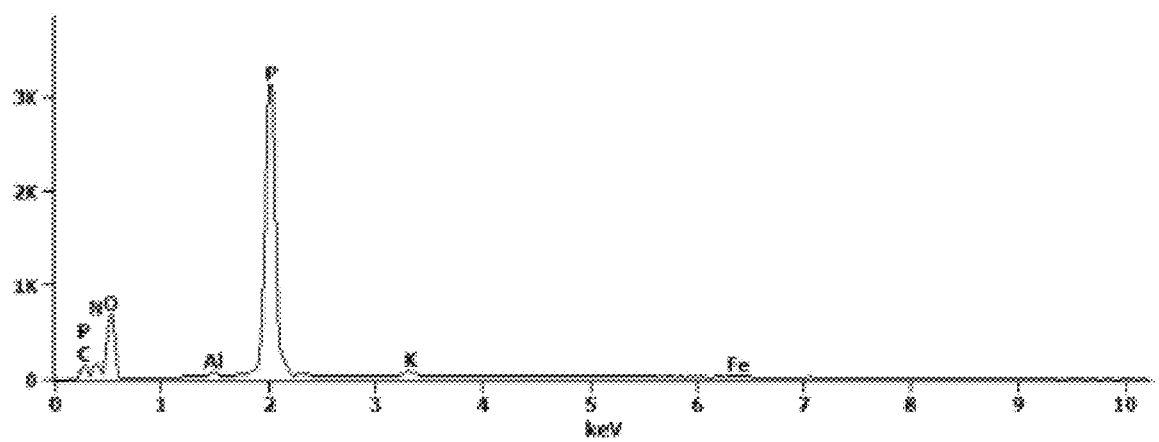
FIG. 18 is an EDS spectrum obtained for location 11 shown in FIG. 7.
Figure 19:
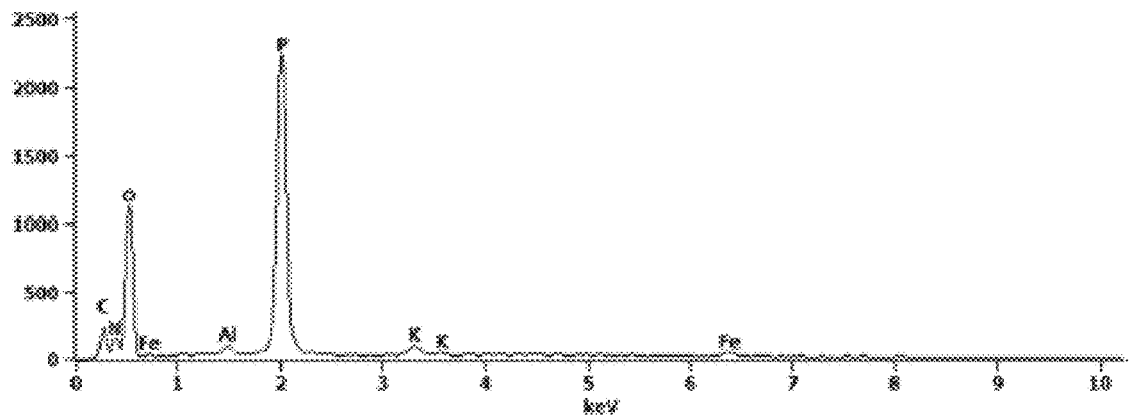
FIG. 19 is an EDS spectrum obtained for location 12 shown in FIG. 7.
Figure 20:
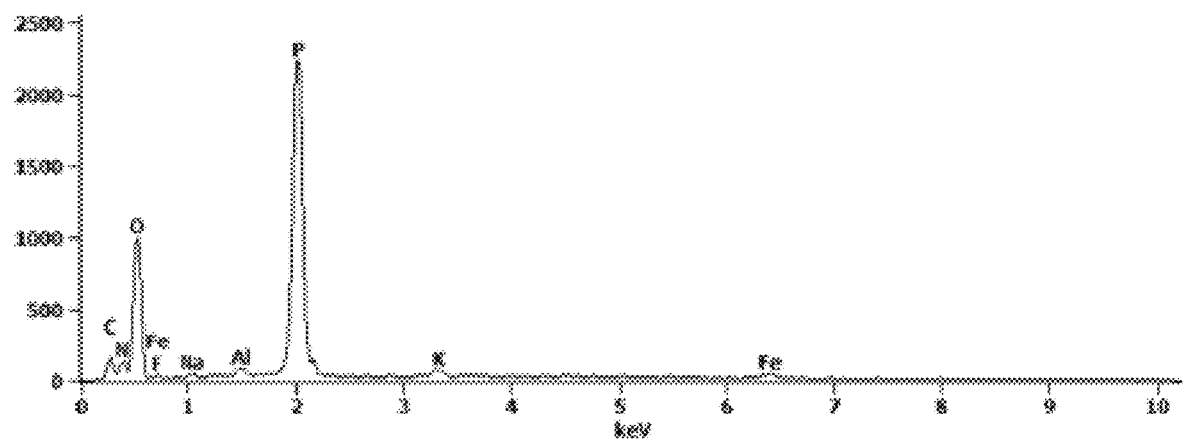
FIG. 20 is an EDS spectrum obtained for location 13 shown in FIG. 7.
Figure 21:
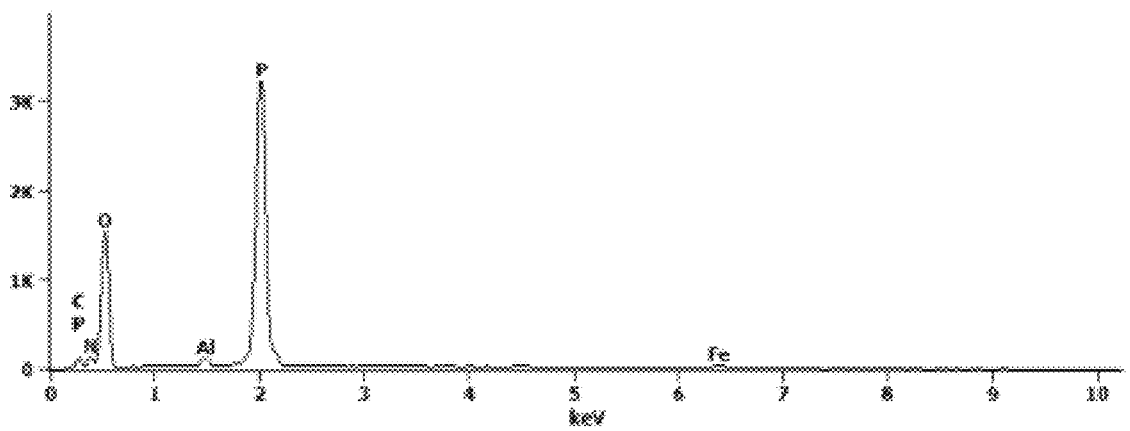
FIG. 21 is an EDS spectrum obtained for location 14 shown in FIG. 7.
Figure 22:
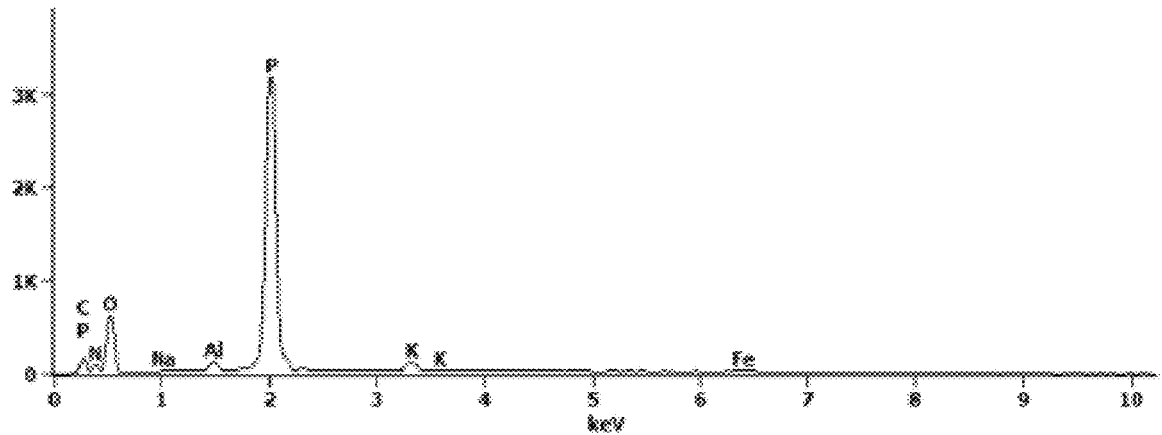
FIG. 22 is an EDS spectrum obtained for location 15 shown in FIG. 7.
Figure 23:
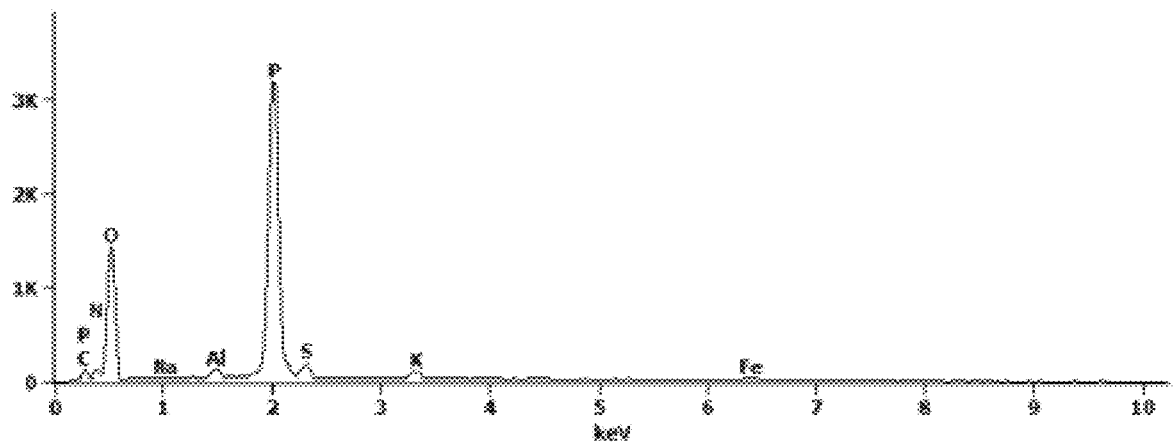
FIG. 23 is an EDS spectrum obtained for location 16 shown in FIG. 7.
Figure 24:
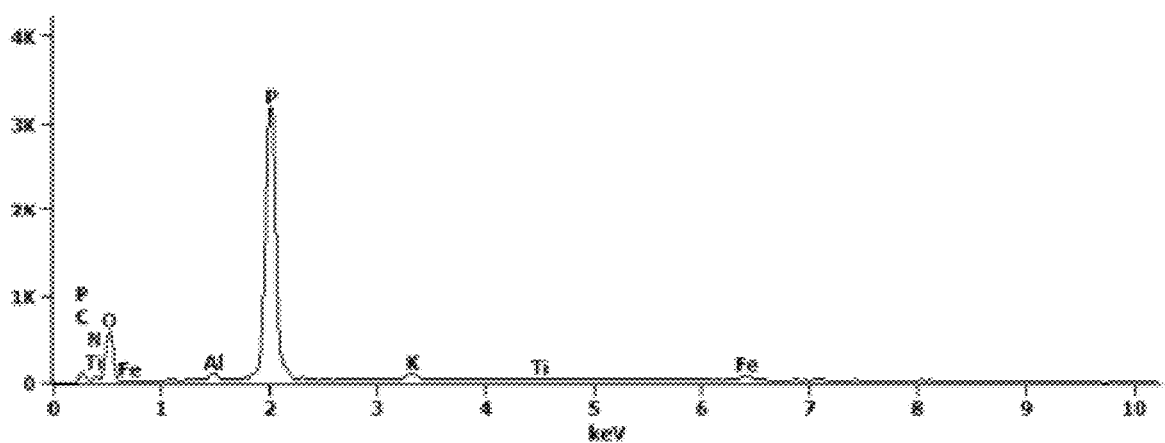
FIG. 24 is an EDS spectrum obtained for location 17 shown in FIG. 7.
Figure 25:
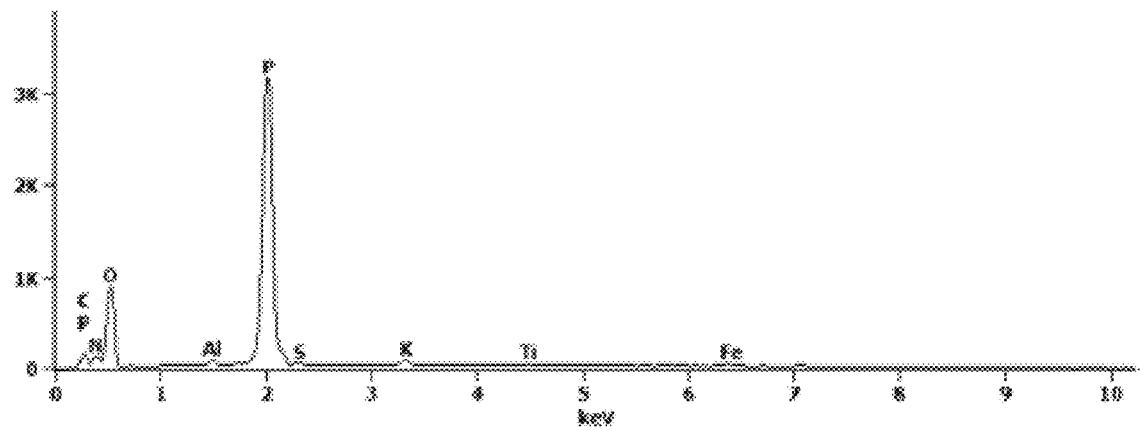
FIG. 25 is an EDS spectrum obtained for location 18 shown in FIG. 7.

FIG. 7 shows a backscattered electron image of particulate from Inventive Sample 3. The numbers on FIG. 7 denote the locations of the EDS spectra provided in FIGS. 8-25. The peaks present in EDS spectra are labeled with the chemical symbol for the element detected. In general, the peak height is proportional to the amount of the element present. As shown in FIGS. 7-25, all nitrate crystals in Inventive Sample 3 contained an abundance of micron-sized phosphate crystals that were homogenously scattered throughout the entire sample. The figures also show that there is no free nitrate in Inventive Sample 3.

The EDS Spectra for Comparative Samples 5, 6, and 7 showed an abundance of ammonium nitrate crystals present in the samples that were not tightly compacted with phosphate. Observations of Comparative Samples 5, 6, and 7 showed that the ground MAP, DAP, or polyphosphate powder additives were only suspended in the ammonium nitrate melt and not tightly compacted. Also, Comparative Samples 5, 6, and 7 did not contain an abundance of submicron sized phosphate particles. This analysis suggests limited reaction between ground additives and the ammonium nitrate melt, with MAP, DAP and ammonium polyphosphate powder occurring as discrete crystalline phases forming aggregates with ammonium nitrate.

Figure 26:
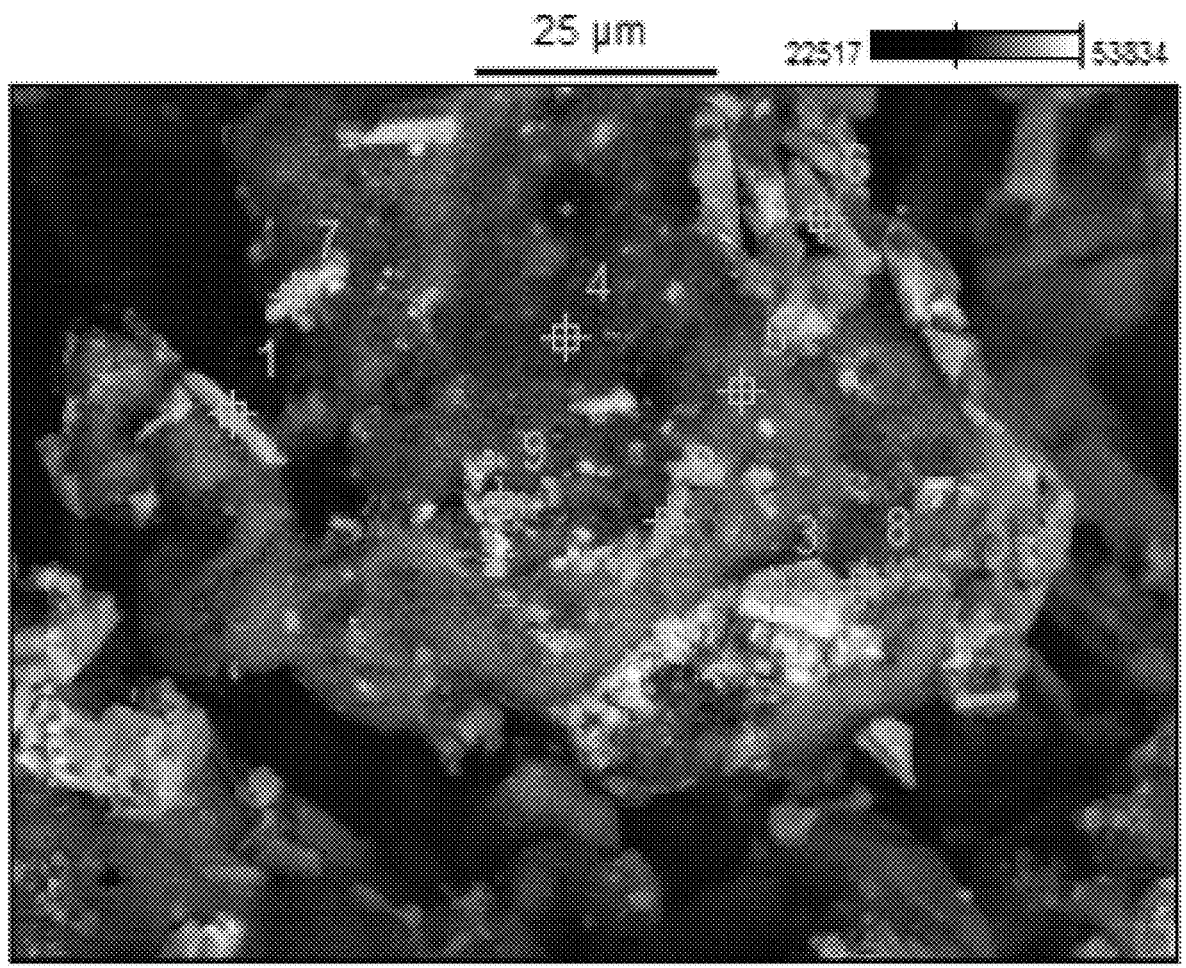
FIG. 26 is a backscattered electron image of a subsample of a comparative sample (Comparative Sample 6).
Figure 27:
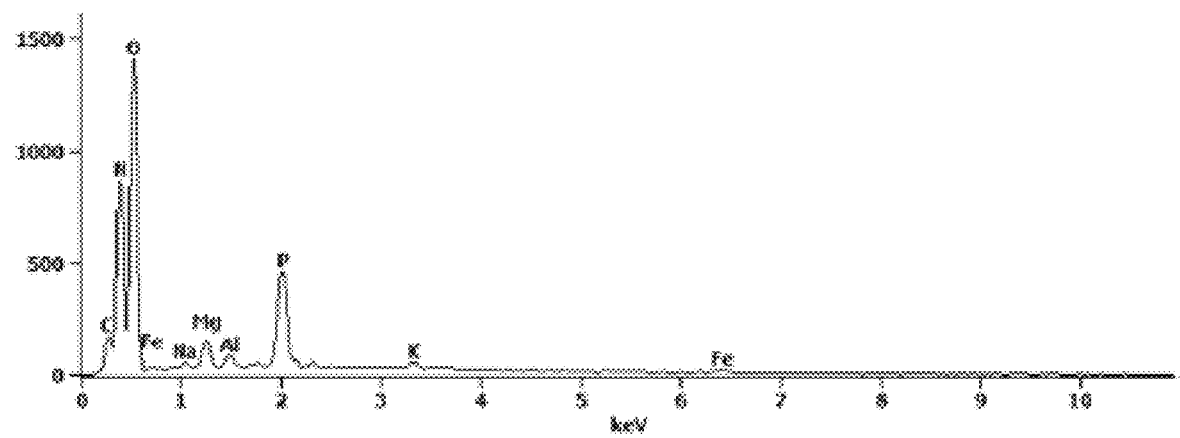
FIG. 27 is an EDS spectrum obtained for location 2 shown in FIG. 26.
Figure 28:
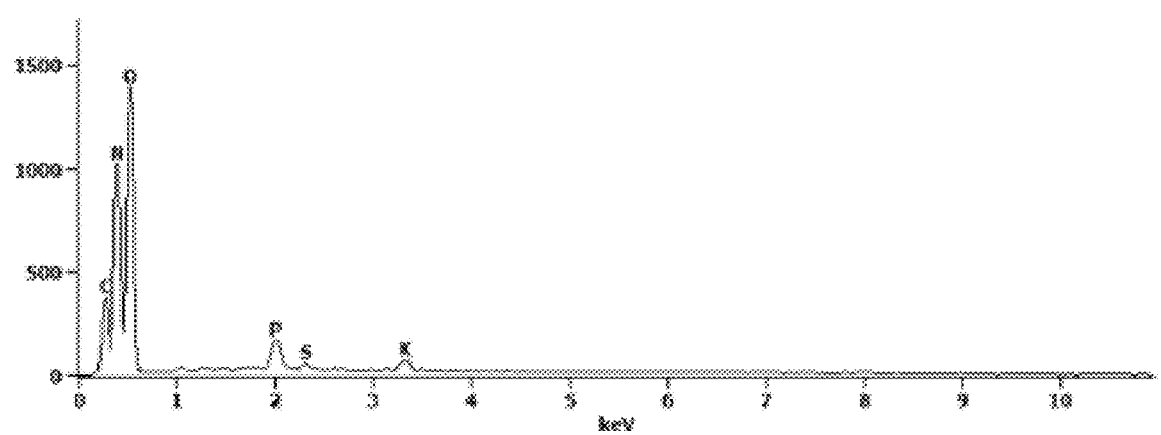
FIG. 28 is an EDS spectrum obtained for location 4 shown in FIG. 26.
Figure 29:
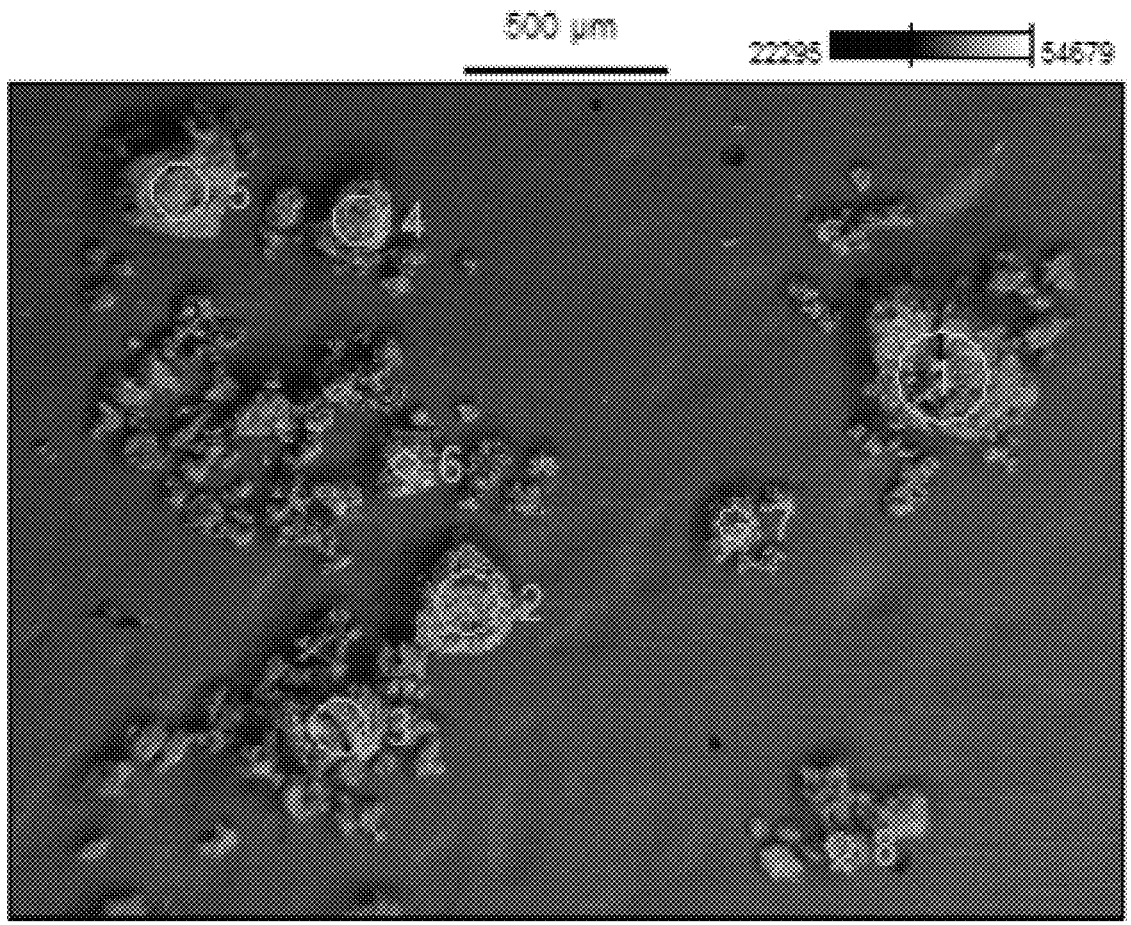
FIG. 29 is a backscattered electron image of a subsample of a comparative sample (Comparative Sample 7).
Figure 30:
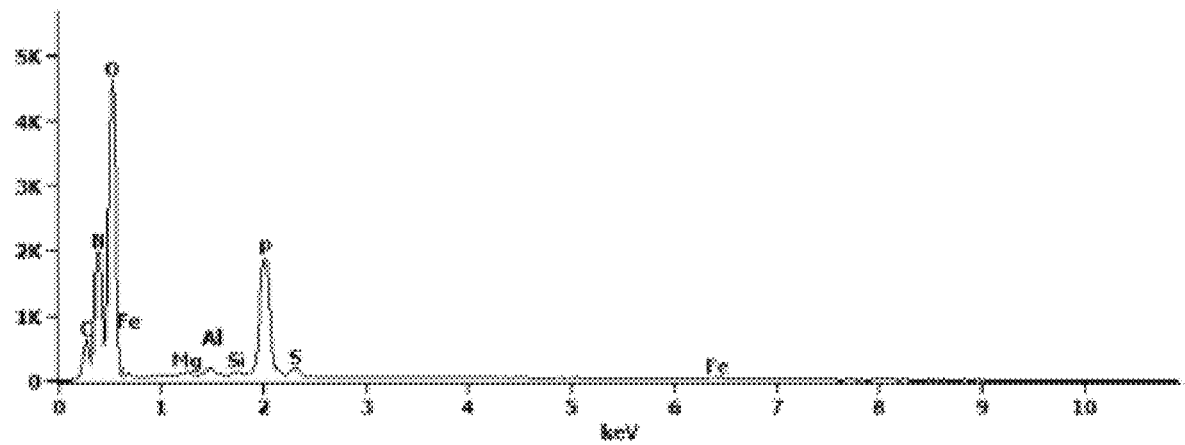
FIG. 30 is an EDS spectrum obtained for location 1 shown in FIG. 29.
Figure 31:
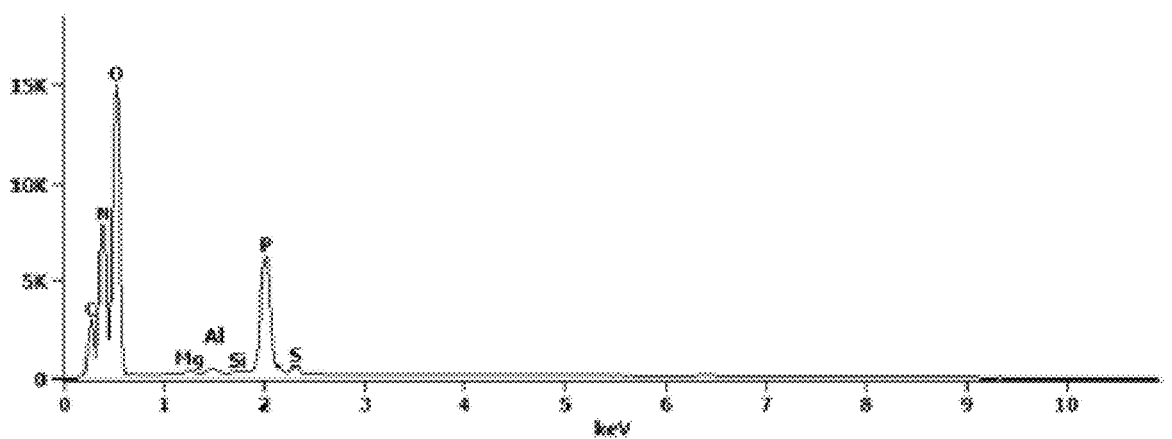
FIG. 31 is an EDS spectrum obtained for location 3 shown in FIG. 29.

Moreover, there was presence of free nitrate in each of Comparative Samples 6 and 7. FIG. 26 shows a backscattered electron image of a subsample of Comparative Sample 6. FIGS. 27 and 28 show EDS spectra obtained for locations 2 and 4, respectively, shown in FIG. 26. FIG. 29 is a backscattered electron image of a subsample of Comparative Sample 7. FIGS. 30 and 31 show EDS spectra obtained for locations 1 and 3, respectively, shown in FIG. 29. As can be seen from FIGS. 26-31, free nitrate was present in both Comparative Sample 6 and Comparative Sample 7.

Example 3: Explosivity Testing of Inventive Fertilizer Compositions

A series of Division 5.1 Oxidizer Test (Burn Test) and Detonation Tests according to the United Nations Recommendations on the Transport of Dangerous Goods, Manual of Tests and Criteria (2019) were performed to determine whether Inventive Samples 1-3 were resistant to detonation. Below is a list of the tests performed and a brief description of each:

1. UN Gap Test: This test is used to measure the ability of a substance, under confinement in a steel tube, to propagate a detonation by subjecting it to the detonation from a booster charge.
2. Koenen Test: This test is used to determine the sensitiveness of solid and liquid substances to the effect of intense heat under high confinement.
3. Time/Pressure Test: This test is used to determine the effects of igniting the substance under confinement to determine if ignition leads to a deflagration with explosive violence at pressures which can be attained with substances in normal commercial packages.
4. Division 5.1 Oxidizer Test: The test method is designed to measure the potential for a solid substance to increase the burning rate or burning intensity of a combustible substance when the two are thoroughly mixed.
5. Fertilizer Trough Test: This test determines the self-sustaining exothermic decomposition of a fertilizer containing nitrates.

Inventive Samples 1-3 each passed the U.N. Series 2 GAP Test and were classified as "not sensitive to detonative shock" and "not an Explosive." Table 2 below summarizes the results of the tests. While it is indicated that Inventive Sample 3 "will propagate detonation," it has since been determined that the result of the test was not interpreted in a manner consistent with standard protocol and, hence (as substantiated in Examples 8 and 9 below), Inventive Sample 3 is believed to have passed the U.N. Series 1 Gap Test.

TABLE 2

Results of Explosivity Testing

| UN Test Method | Product Description | | |
|---|---|---|---|
| | Inventive Sample 1 | Inventive Sample 2 | Inventive Sample 3 |
| Test Series 1 Gap Test | | | "+" - substance will propagate detonation |
| Test Series 1 Koenen Test | | | "−" - substance showed no effect on heating under confinement |
| Test Series 1 Time/Pressure Test | | | "−" - substance show no likelihood of deflagration |
| Division 5.1 Oxidizer Test | | | Substance is not a Div. 5.1 Oxidizer |
| Test Series 2 Gap Test | "−" - substance is not sensitive to detonative shock | "−" - substance is not sensitive to detonative shock | "−" - substance is not sensitive to detonative shock |
| Test Series 2 Koenen Test | "−" - substance showed no violent effect on heating under confinement | "−" - substance showed no violent effect on heating under confinement | "−" - substance showed no violent effect on heating under confinement |
| Test Series 2 Time/Pressure Test | "−" - substance show no or slow deflagration | "−" - substance show no or slow deflagration | "−" - substance show no or slow deflagration |
| Overall Rating | Not An Explosive | Not An Explosive | Not An Explosive |
| Trough Test | | Passed | |

Example 4: Pilot Plant Demonstration of Inventive Fertilizer Compositions

Methods

Pilot plant-scale test work on the production of an inventive ammonium nitrate-based fertilizer was conducted. The inventive fertilizer produced was a mixture of ammonium nitrate and 11-37-0 liquid fertilizer containing ammonium polyphosphate (APP). The inventive fertilizer was prepared by first prilling seed material, and then spraying a concentrated melt of ammonium nitrate and 11-37-0 liquid fertilizer containing APP inside a granulation drum with a falling curtain configuration onto the prills. The inventive fertilizer was 69.5% ammonium nitrate and 30.5% 11-37-0 liquid fertilizer (with APP), containing 32% water. As water was removed from the original mixture during the concentration step of the process, the slurry temperature was increased, and the liquid transitioned into a melt consistency and thickened. This occurrence was noted as the so-called fudge point temperature and was the main indicator of when the slurry was concentrated and ready to be sprayed during prilling and drum granulation. The melt temperature in the prilling and granulation process was 250-260° Fahrenheit (F).

Results

The 11-37-0 liquid fertilizer containing APP and molten ammonium nitrate were successfully combined in a stainless-steel steam jacketed tank equipped with an agitator to produce a concentrated melt with no scaling issues during the water removal process. The inventive fertilizer was successfully prilled ("Pilot Plant Inventive Prill Fertilizer"). The inventive fertilizer was also successfully granulated ("Pilot Plant Inventive Granular Fertilizer"). The Pilot Plant Inventive Granular Fertilizers were produced using a drum granulator with the falling curtain drum arrangement.

The physical and chemical properties of two Pilot Plant Inventive Granular Fertilizers were tested, a summary of which is shown in Table 3 below. As shown in Table 3, the two Pilot Plant Inventive Granular Fertilizers had very good physical properties. The abrasion resistance and crushing strength (hardness) tests results were very good at 0.03-0.05% fines, and 11.53 and 12.24 lbs/granule, respectively. The chemical analyses of the two Pilot Plant Inventive Granular Fertilizers were consistent with a total N content of 27.41 and 27.74, and a total $P_2O_5$ content of 17.51 and 17.99, respectively. Targeted analysis was 28-16-0.

Figure 33:
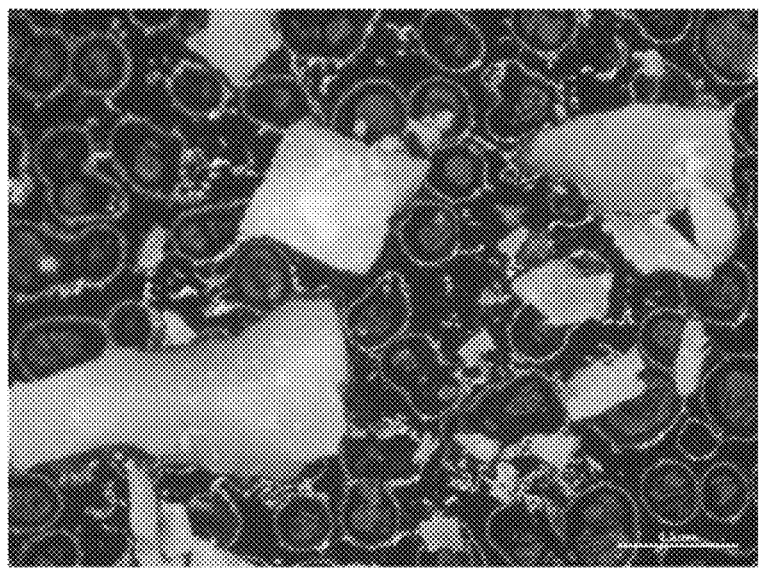
FIG. 33 is a stereomicroscope image of a fractured pellet material from the Pilot Plant Inventive Granular Fertilizer.

Pellet diameters varied with most diameters in the 2 to 4 mm range, though some down to 1 mm were noted. Crushed pellets appeared gray and exhibited ceramic-like texture, as shown in FIG. 33. PLM analysis revealed that the material comprised aggregated, polycrystalline particulates. Occasional crystals exhibited recognizable faces but were generally very fine-grained. Grinding with a mortar and pestle continued to reveal mostly polycrystalline material, but some individual crystals were noted as having optical properties consistent with ammonium nitrate. The addition of ethanol with additional grinding continued to show polycrystalline material with optical properties similar to ammonium phosphate and/or polyphosphate. Some elongated crystals were noted that exhibited parallel extinction, negative sign of elongation, and refractive indices consistent with monoammonium phosphate (MAP).

Figure 34:
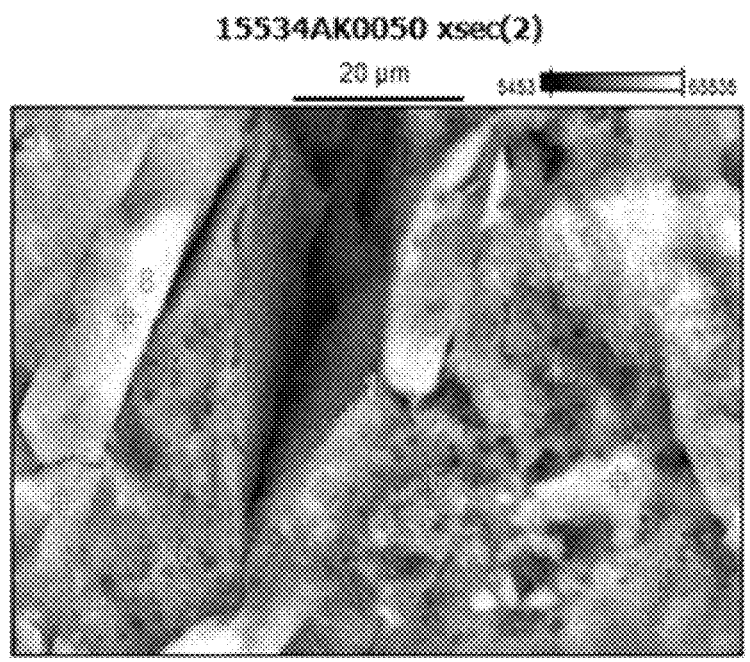
FIG. 34 is a backscattered electron image of a subsample of the Pilot Plant Inventive Granular Fertilizer.
Figure 35:
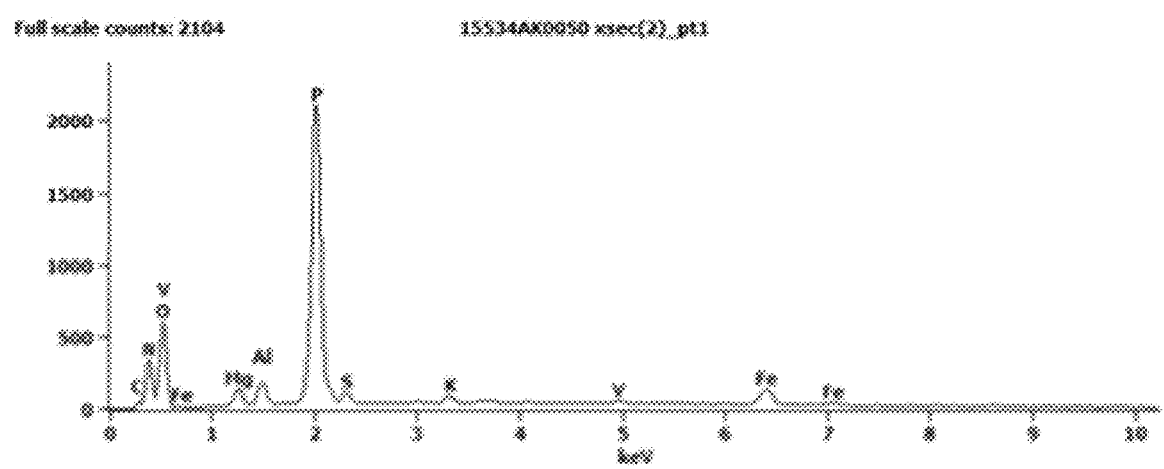
FIG. 35 is an EDS spectrum obtained for location 1 shown in FIG. 34.
Figure 36:
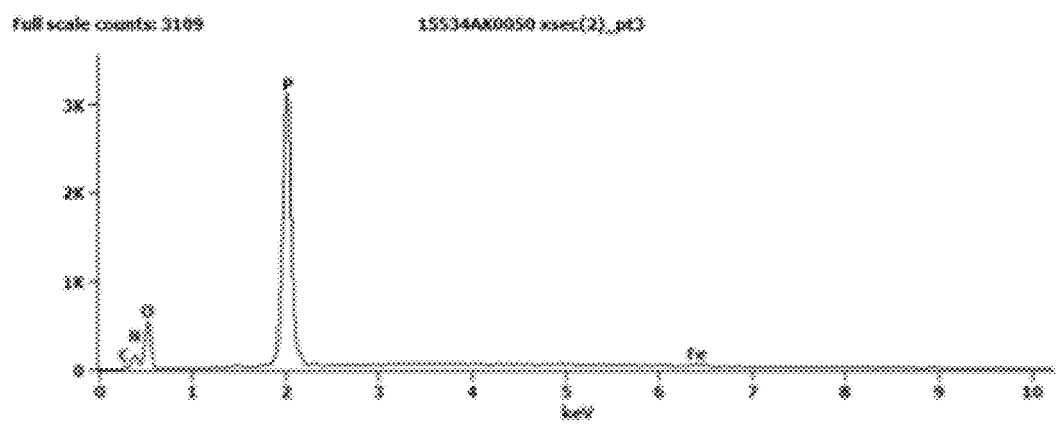
FIG. 36 is an EDS spectrum obtained for location 3 shown in FIG. 34.
Figure 37:
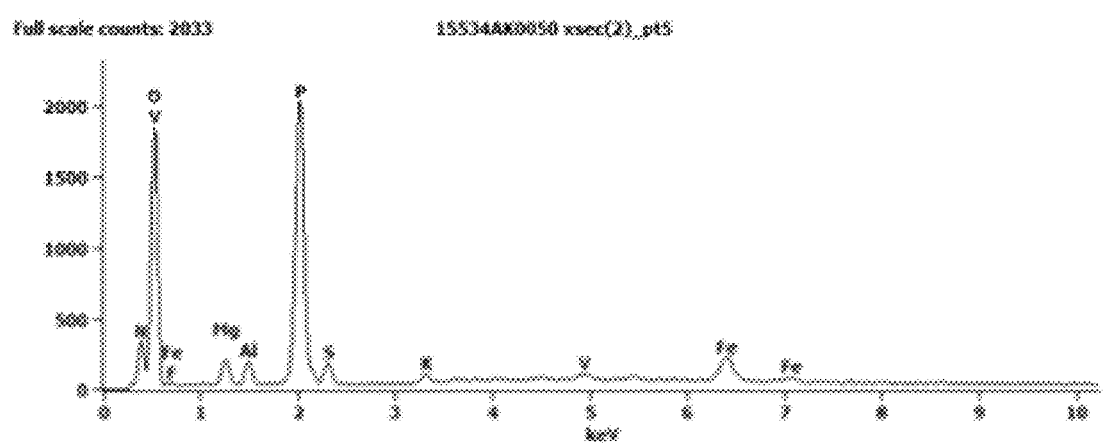
FIG. 37 is an EDS spectrum obtained for location 5 shown in FIG. 34.
Figure 38:
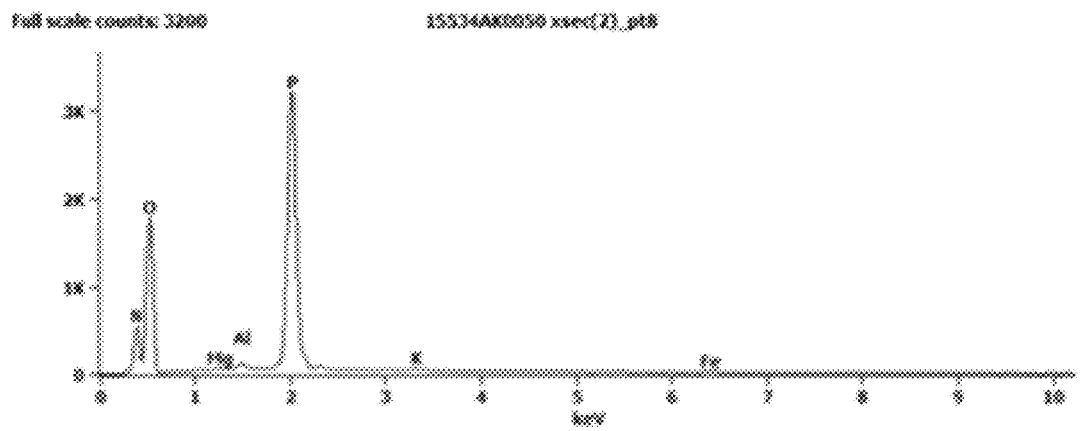
FIG. 38 is an EDS spectrum obtained for location 8 shown in FIG. 34.

SEM-ED analysis confirmed the microcrystalline nature of the granules. Microscopic pores appeared to be abundant on broken interior surfaces. FIG. 34 shows a backscattered electron image of particulate from the Pilot Plant Inventive Granular Fertilizer. The numbers on FIG. 34 denote the locations of the EDS spectra provided in FIGS. 35-38. The peaks present in EDS spectra are labeled with the chemical symbol for the element detected. In general, the peak height is proportional to the amount of the element present. As shown in FIGS. 35-38, the granules are composed of nitrogen, phosphorus, and oxygen with minor traces of other

TABLE 3

Summary of Physical Property Testing & Chemical Analysis of Pilot Plant Inventive Granular Fertilizers

| Sample | Moisture % | N % | $P_2O_5$ % | SGN | UI | Abrasion (% fines) | Hardness (lbs./granule) |
|---|---|---|---|---|---|---|---|
| Pilot Plant Inventive Granular Fertilizer #1 | 0.02 | 27.41 | 17.51 | 285.2 | 44.4 | 0.03 | 11.53 |
| Pilot Plant Inventive Granular Fertilizer #2 | 0.02 | 27.74 | 17.99 | 252.8 | 51.2 | 0.05 | 12.24 |

Example 5: Chemical and Crystal Analysis of Pilot Plant Inventive Prill and Granular Fertilizers Methods Samples of the Pilot Plant Inventive Prill Fertilizer and the Pilot Plant Inventive Granular Fertilizer were analyzed for chemical makeup and crystallography. Preliminary examinations were conducted using an Olympus SZ40 stereomicroscope. Representative subsamples of material were analyzed by polarized light microscopy (PLM), scanning electron microscopy-energy dispersive x-ray spectrometry (SEM-EDS), and confocal Raman microscopy (CRM). PLM analysis was performed using an Olympus BHSP polarized light microscope. SEM-EDS analysis was conducted with a JEOL JSM-IT700HR field emission scanning electron microscope coupled to a Thermo Scientific Noran System 7 energy dispersive x-ray spectral analysis system. CRM analysis was performed using a Renishaw in Via confocal Raman microscope.

Results

Pilot Plant Inventive Granular Fertilizer

Figure 32:
FIG. 32 is a stereomicroscope image of the Pilot Plant Inventive Granular Fertilizer.

The granules presented as cream-colored, generally spheroidal pellets having irregular surfaces, as shown in FIG. 32.

detectable elements. The EDS spectra also suggests a preponderance of ammonium phosphate phases, including probable MAP.

In summary, the granules are composed of microcrystalline material that appeared to be comprised primarily of ammonium phosphate+polyphosphate phases based upon EDS data. SEM images indicated that abundant microscopic pores were present. Individual crystals consistent with ammonium nitrate were indicated by PLM. MAP crystals appeared to occur sporadically in ethanol treated material by PLM and SEM-EDS.

Pilot Plant Inventive Prill Fertilizer

Figure 39:
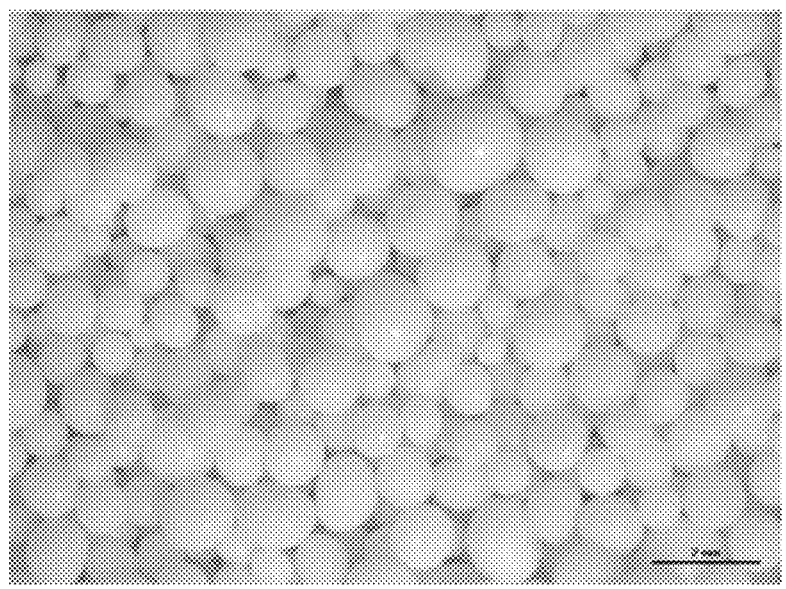
FIG. 39 is a stereomicroscope image of the Pilot Plant Inventive Prill Fertilizer.
Figure 40:
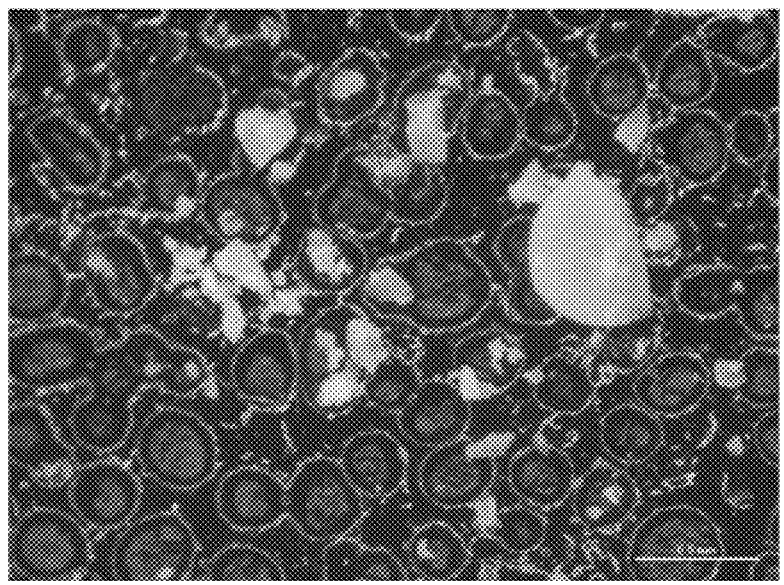
FIG. 40 is a stereomicroscope image of a fractured pellet material from the Pilot Plant Inventive Prill Fertilizer.

The prills presented as cream-colored, spheroidal to elliptical pellets having generally smooth surfaces, as shown in FIG. 39. Occasional indentations were observed in spheroidal pellets. Pellet diameters varied but were consistently less than 2 mm with many diameters≤1 mm. Crushed pellet material appeared gray and exhibited a ceramic-like texture, as shown in FIG. 40.

PLM analysis revealed the material of the Pilot Plant Inventive Prill Fertilizer to be comprised of aggregated, polycrystalline particulates. Occasional crystals exhibited recognizable faces but were generally very fine-grained. The addition of ethanol with additional grinding continued to show polycrystalline material with optical properties comparable to ammonium phosphate and/or polyphosphate. Medium to highly birefringent crystals consistent with ammonium nitrate were present in ethanol ground material. A few elongated crystals/clusters that exhibited properties consistent with MAP were also detected.

Figure 41:
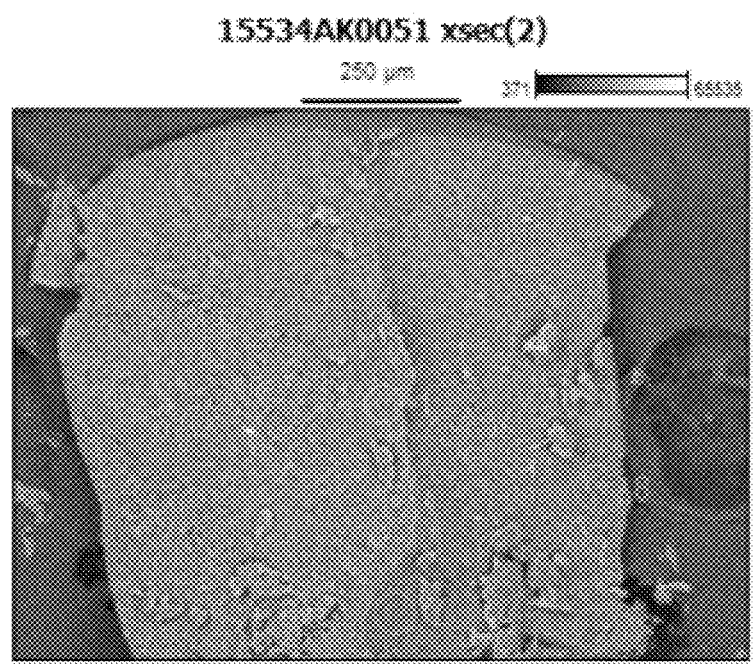
FIG. 41 is a backscattered electron image of a subsample of the Pilot Plant Inventive Prill Fertilizer.
Figure 42:
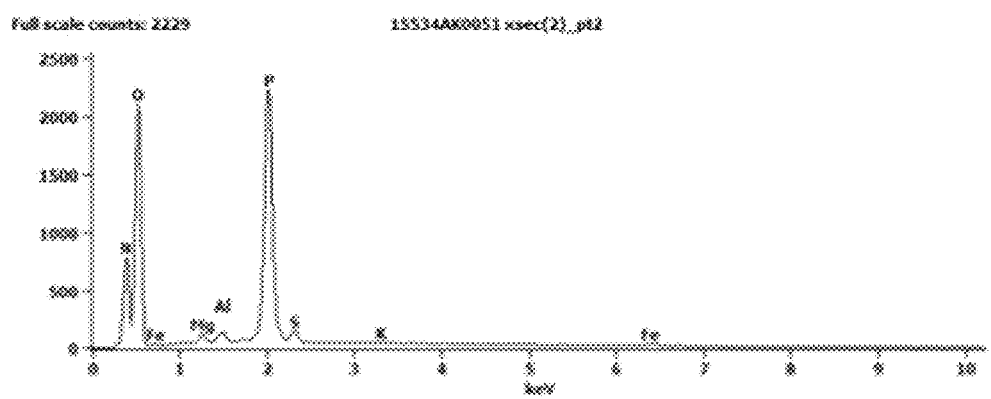
FIG. 42 is an EDS spectrum obtained for location 2 shown in FIG. 41.
Figure 43:
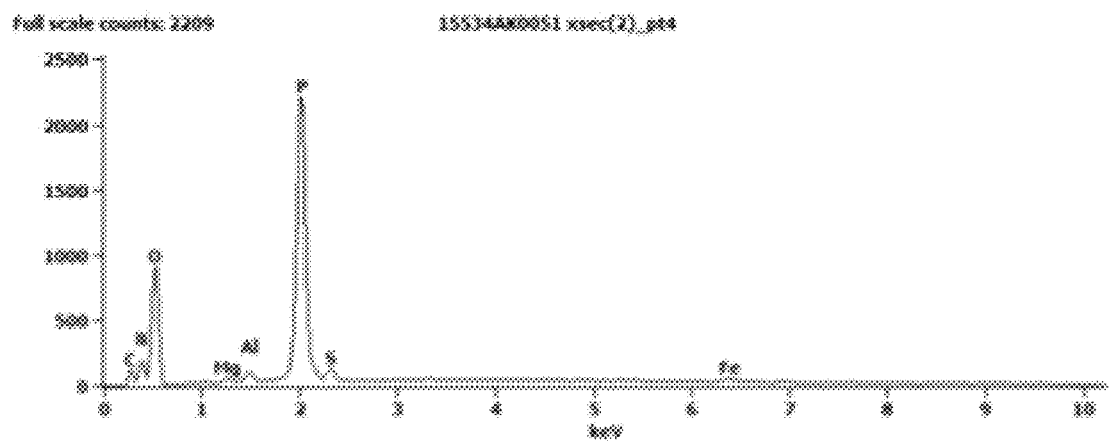
FIG. 43 is an EDS spectrum obtained for location 4 shown in FIG. 41.
Figure 44:
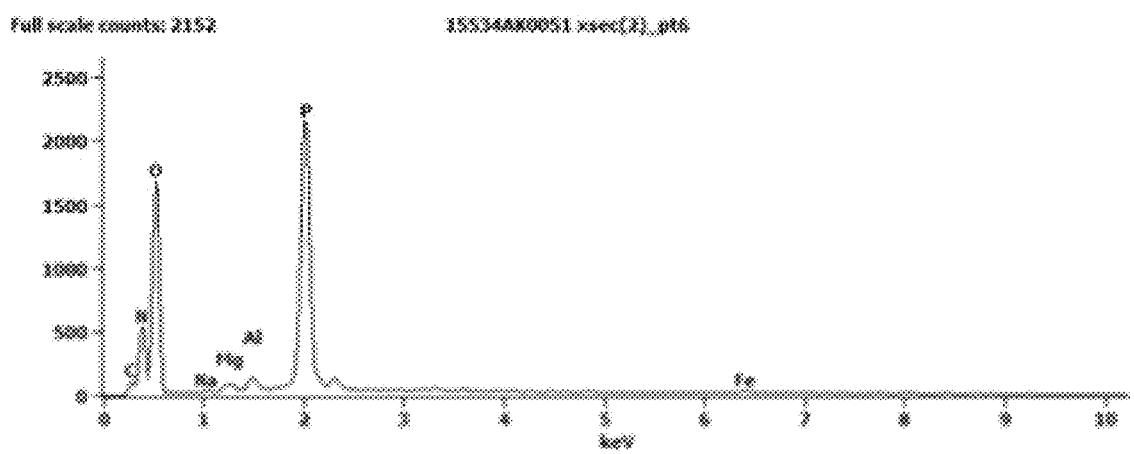
FIG. 44 is an EDS spectrum obtained for location 6 shown in FIG. 41.

SEM-ED analysis confirmed the microcrystalline nature of the prills. The microstructure of the prills appeared somewhat reticulated. FIG. 41 shows a backscattered electron image of particulate from the Pilot Plant Inventive Prill Fertilizer. The numbers on FIG. 41 denote the locations of the EDS spectra provided in FIGS. 42-44. The peaks present in EDS spectra are labeled with the chemical symbol for the element detected. In general, the peak height is proportional to the amount of the element present. As shown in FIGS. 42-44, the prills are composed of nitrogen, phosphorus, and oxygen with lesser amounts of detectable elements. The EDS spectra also suggests a preponderance of ammonium phosphate phases, including probable MAP.

In summary, the prills were composed of microcrystalline material comprised primarily of ammonium phosphate+polyphosphate phases based upon EDS data. The prills exhibited a microscopic, reticulated texture by SEM. Individual crystals consistent with ammonium nitrate are indicated by PLM in ethanol treated material.

Example 6: Physical Property Testing of Pilot Plant Inventive Granular Fertilizer and Comparative Prilled Ammonium Nitrate Methods The Pilot Plant Inventive Granular Fertilizer and a comparative sample of prilled ammonium nitrate were submitted to the International Fertilizer and Development Center for the determination of the Critical Relative Humidity and Moisture Absorption-Penetration.

Critical Relative Humidity (CRH) is defined as the relative humidity of the atmosphere at which a material will absorb moisture from the atmosphere and below which it will not absorb moisture from the atmosphere. To determine the CRH, each sample was placed in a pre-weighed plastic cup. The cup with the sample was weighed and placed inside a laboratory temperature-humidity chamber at a predetermined relative humidity. The sample underwent exposure for 3 hours, with the sample being weighed at the end of each hour. If the sample did not exhibit significant progressive absorption of moisture, the humidity in the cabinet was raised for the next exposure period and a fresh sample was used, as described above. The procedure was repeated until the sample exhibited progressive absorption of moisture.

Hygroscopicity is the degree to which a material will absorb moisture from the atmosphere. Hygroscopicity of fertilizers is important when considering conditions under which a bulk pile can be stored and how it affects material flowability during handling and field application. Fertilizer materials vary in their ability to withstand physical deterioration (wetting and softening) when exposed to a humid atmosphere. Even materials with about the same CRH often behave differently as a result of differences in "moisture-holding capacity;" therefore, determination of CRH alone is not sufficient to indicate the hygroscopicity of a fertilizer.

The hygroscopicity of the samples was compared by imposing various periods of humid exposure on the samples contained in completely filled open-top glass cups. The hygroscopicity tests are comprised of: (1) moisture absorption, which is the rate of moisture pickup per unit of exposed surface; (2) moisture penetration, which is the depth of moisture penetration (visible wetting of the material); (3) moisture-holding capacity, which is the amount of moisture that individual particles of fertilizer will absorb before allowing moisture to be transferred by capillary action to adjacent particles; and (4) integrity of wetted granules, which is determined qualitatively by handling the top surface layer of a sample after it has been exposed to a humid atmosphere. The granule integrity is then rated as excellent, good, fair, or poor. Granule integrity is a qualitative observation based on the strength of the top surface layer of granules after exposure for 72 hours. A rating of "excellent" indicates no signs of degradation, and "good" indicates slight degradation of material. With a rating of "fair," the material has degraded but a solid core remains. A rating of "poor" indicates that the material no longer maintains its original shape.

Results

The comparative prilled ammonium nitrate (AN) sample demonstrated a CRH of 45-55% while the Pilot Plant Inventive Granular Fertilizer demonstrated a CRH of 55-65%. Without being bound by any particular theory, the increase in CRH in the Pilot Plant Inventive Granular Fertilizer is likely due to the homogenous microcrystalline material (micron and sub-micron size) that appears to be comprised primarily of ammonium phosphate±polyphosphate phases evenly distributed throughout the ammonium nitrate, as discussed in Example 5 above.

The results of the moisture-absorption penetration tests are shown in Table 4 below. The comparative prilled AN exhibited significant degradation during the moisture absorption-penetration test, while the Pilot Plant Inventive Granular Fertilizer did not exhibit significant degradation. The comparative prilled AN solubilized much more quickly and reduced in volume compared to the Pilot Plant Inventive Granular Fertilizer. The Pilot Plant Inventive Granular Fertilizer also had a higher moisture holding capacity when compared to the comparative prilled AN. The Pilot Plant Inventive Granular Fertilizer had an average moisture absorption of 639 milligrams/cm$^2$ (mg/cm$^2$), a moisture penetration of 4.7 centimeters (cm), a moisture-holding capacity of 135.4 milligrams/cubic centimeter (mg/cm$^3$), and a moisture-holding capacity percentage of 12.6%. The comparative prilled AN had an average moisture absorption of 1,539 mg/cm$^2$ and a moisture penetration of more than 20 cm which was unable to be measured. The comparative prilled AN extrapolated values were a moisture-holding capacity of 20.0 mg/cm$^3$ and a moisture-holding capacity percentage of 2.2%. The granule integrity of the wetted granules of both the comparative prilled AN and the Pilot Plant Inventive Granular Fertilizer was poor, which is common in nitrate-based fertilizers.

TABLE 4

Physical Properties of Pilot Plant Inventive Granular Fertilizer and Comparative Prilled Ammonium Nitrate

| Test Identification | Comparative Prilled AN | | Comparative Prilled AN Average | Pilot Plant Inventive Granular Fertilizer | | Pilot Plant Inventive Granular Fertilizer Average |
|---|---|---|---|---|---|---|
| Critical Relative Humidity[a] (%) | | 45-55 | | | 55-65 | |
| Moisture Absorption-Penetration[b] (72 hours at 30° C., 90% Relative Humidity) | | | | | | |
| Moisture Absorption, mg/cm$^2$ | 1,582 | 1,496 | 1,539 | 576 | 701 | 639 |
| Moisture Penetration, cm | 20+ | 20+ | 20+ | 4.7 | 4.8 | 4.7 |
| Moisture-Holding Capacity, mg/cm$^3$ | —* | — | — | 123 | 147.7 | 135.4 |
| Moisture-Holding Capacity, % | — | — | — | 11.4 | 13.8 | 12.6 |
| Granule Integrity, wet | Poor | Poor | Poor | Poor | Poor | Poor |

[a] Determined using procedure IFDC S-101 in the *Manual for Determining Physical Properties of Fertilizer* (IFDC R-10).
[b] Determined using procedure IFDC S-100 in the *Manual for Determining Physical Properties of Fertilizer* (IFDC R-10).
*Data cannot be calculated.

Example 7: Differential Scanning Calorimetry (DSC) and Accelerated Rate Calorimetry (ARC) Testing of Pilot Plant Inventive Granular Fertilizer and Comparative Prilled Ammonium Nitrate Methods The Pilot Plant Inventive Granular Fertilizer and a comparative sample of prilled ammonium nitrate were tested to provide quantitative information relating to exothermic or endothermic temperatures and pressures generated as the sample is heated in a closed system.

Differential Scanning calorimetry (DSC) is a technique used to measure changes in material heat as a function of time and temperature. These heat changes are often associated with reactions or transitions in materials. The measurements from the DSC instrument (DSC 214 Polyma-Differential Scanning calorimeter manufactured by Netzsch™ Group of Selb, Germany) provide quantitative and qualitative information about physical and chemical changes that involve exothermic or endothermic processes, or changes in heat capacity. The DSC is used primarily to determine glass transition temperatures, melting, and boiling points, heats of fusion and specific heats. This data can be used directly in process optimization and in kinetic studies of reactive chemicals, to predict product performance and chemical degradation characteristics.

The DSC tests used gold-plated high-pressure stainless-steel crucibles which could withstand up to 100 bar of pressure. Sample preparation for the DSC tests was as follows: (1) under air atmosphere, the sample was transferred into a high-pressure gold-plated stainless steel test crucible; (2) the test cell (crucible) was then sealed using a new gold-coated seal under the air, and (3) the samples were tested over a temperature range of 25° C. to 400° C. in closed test cells with a heating ramp rate of 2° C./min.

The Accelerating Rate calorimeter (ARC®) provides the time, temperature, and pressure relationships for exothermic reactions under adiabatic conditions for reactive systems. The ARC can be used to obtain information about the thermal (fire) and pressure (explosion) hazard parameters of a self-heating material or a mixture of reactants.

Results

Figure 45:
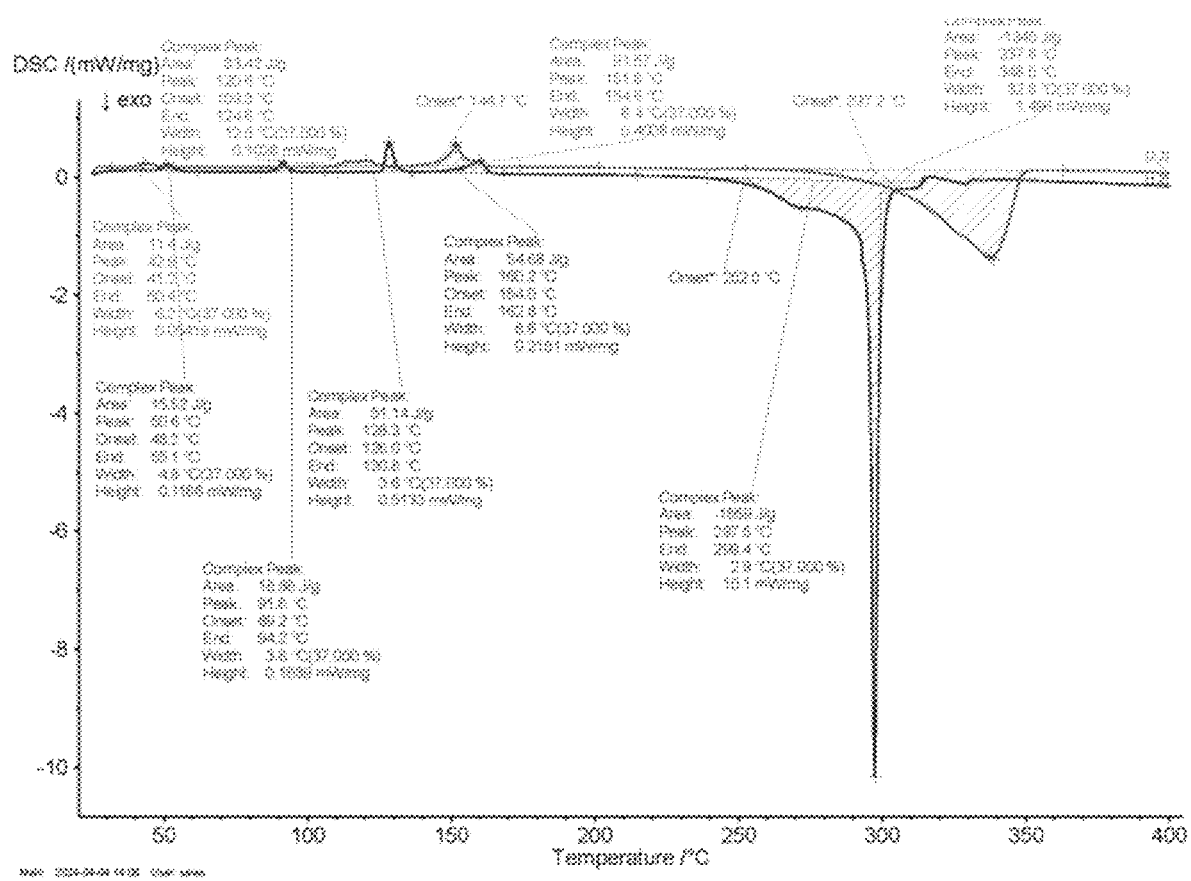
FIG. 45 is a graph showing the results of Differential Scanning calorimetry (DSC) testing of the Pilot Plant Inventive Granular Fertilizer and the comparative prilled ammonium nitrate.

A summary of the DSC test results is shown in Table 5 and FIG. 45. As shown in Table 5 and FIG. 45, the DSC testing showed that the comparative prilled AN had an onset temperature of 252° C. and the Pilot Plant Inventive Granular Fertilizer had an onset temperature of 297° C.

TABLE 5

Summary of DSC Test Results

| DSC Test # | Test Name | Prepared under | Sample Mass (mg) | Observed Result | Extrapolated Onset* T (° C.) | ΔHr (J/g) |
|---|---|---|---|---|---|---|
| 1 | Comparative Prilled AN | Air | 10.9 | Endotherm | 48.2 | 15.52 |
| | | | | Endotherm | 89.2 | 18.88 |
| | | | | Endotherm | 126.0 | 51.14 |
| | | | | Endotherm | 154.0 | 54.68 |
| | | | | Exotherm | 252.0 | −1559 |

TABLE 5-continued

Summary of DSC Test Results

| DSC Test # | Test Name | Prepared under | Sample Mass (mg) | Observed Result | Extrapolated Onset* T (° C.) | ΔHr (J/g) |
|---|---|---|---|---|---|---|
| 2 | Pilot Plant Inventive Granular Fertilizer | Air | 15.8 | Endotherm | 41.2 | 11.4 |
|   |   |   |   | Endotherm | 109.3 | 33.42 |
|   |   |   |   | Endotherm | 144.7 | 91.57 |
|   |   |   |   | Exotherm | 297.2 | −1345 |

*This is extrapolated onset temperature, the point of the intersection between the baseline and the tangent to the DSC curve at the point of maximum gradient. Such temperature is usually higher than the first-deviation onset temperature which is the point in the curve where a deflection is first observed from the established baseline prior to the thermal event, see ISO 11358-1 and ASTM E2550.

Figure 46:
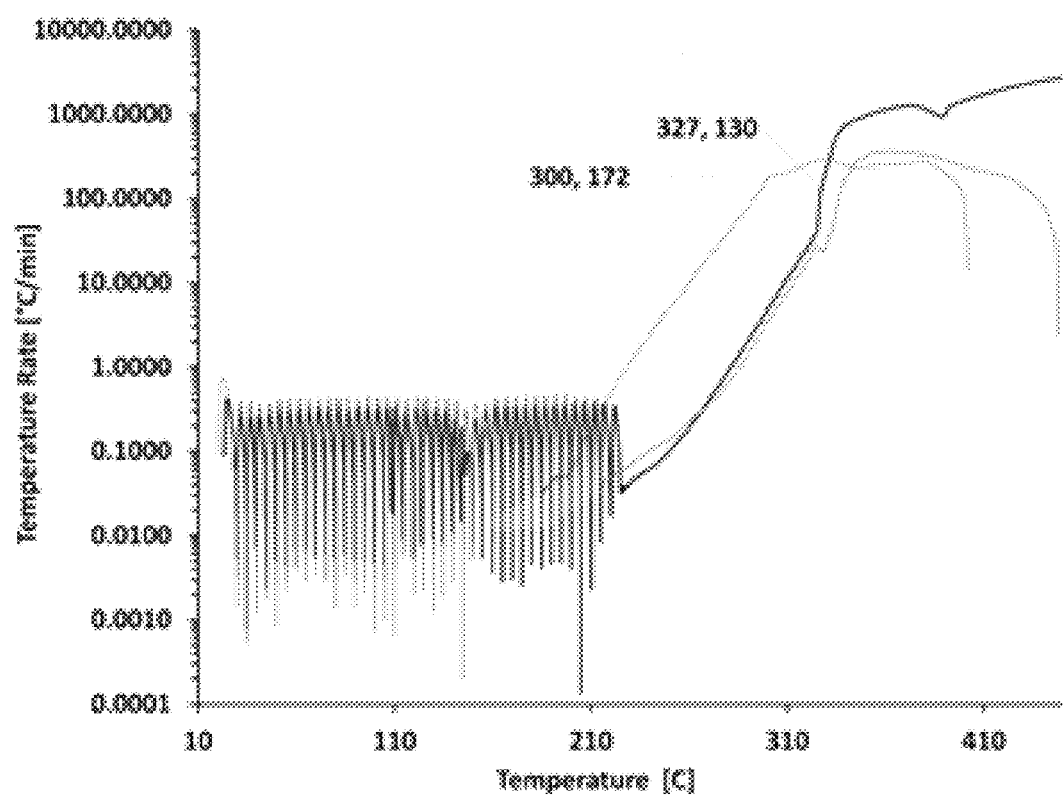
FIG. 46 is a graph showing the results of Accelerating Rate calorimeter testing of the Pilot Plant Inventive Granular Fertilizer and the comparative prilled ammonium nitrate.

A summary of the ARC test results is shown in Table 6 and FIG. 46. As demonstrated in Table 6 and FIG. 46, the ARC testing showed that the comparative prilled AN had an onset temperature of 185° C. and the Pilot Plant Inventive Granular Fertilizer had an onset temperature of 216° C. and 225° C., respectively. The ARC testing also showed that the comparative prilled AN sample crucible ruptured at 2455 minutes into the test at a temperature of 300° C. The temperature during decomposition elevated at a rate of 172° C. per minute and generated pressure at a rate of 3096 psi per minute. The Pilot Plant Inventive Granular Fertilizer sample crucible ruptured at 3209 minutes into the test at a temperature of 327° C. The temperature during decomposition elevated at a rate of 130° C. per minute and generated pressure at a rate of 2193 psi per minute.

TABLE 6

Summary of ARC Test Results

| Sample | Weight Loss (%) | Observed Result | Onset T (° C.) | Measured T Rise (° C.) | Adiabatic T Rise (° C.) | ΔHr (cal/g) |
|---|---|---|---|---|---|---|
| Comparative Prilled AN | NA | Exotherm | 185.83 | 214.83 | 476.54 | −238.27 |
| Pilot Plant Inventive Granular Fertilizer | NA | Exotherm | 225.92 | 671.05 | 1246.40 | −623.20 |
| Pilot Plant Inventive Granular Fertilizer | 39.734 | Exotherm | 216.01 | 163.69 | 542.89 | −271.45 |

Example 8: Explosivity Testing of Pilot Plant Inventive Granular Fertilizer

Methods

The Pilot Plant Inventive Granular Fertilizer was subjected to the following explosivity tests in accordance with the Code of Federal Regulations, Title 49, and the United Nations Transport of Dangerous Goods-Manual of Tests and Criteria, seventh revised edition (2019): (1) U.N. Series 2 Gap Test, (2) Division 5.1 Oxidizer Analysis, and (3) Trough Analysis.

Results

The Pilot Plant Inventive Granular Fertilizer passed the U.N. Series 1 and Series 2 GAP Tests and was classified as "not sensitive to detonative shock." The Pilot Plant Inventive Granular Fertilizer also was not a Division 5.1 Solid Oxidizer because the sample, when in the form tested and combined with cellulose in a 1:1 and 4:1 ratio, appeared to have an average burn time greater than the Packing Group III reference standards, when the UN Test for Oxidizing Solids Test 5.1 was performed on the sample. Moreover, the Pilot Plant Inventive Granular Fertilizer was considered free from the hazard of self-sustaining decomposition because the sample did not propagate throughout the substance when the U.N. Test S.1, Trough test was performed on the sample.

Example 9: Detonability Testing of Pilot Plant Inventive Granular Fertilizer Methods Detonability Testing on the Pilot Plant Inventive Granular Fertilizer and fuel oil (FO) was performed to determine if the Pilot Plant Inventive Granular Fertilizer is detonable or not.

The tests that were performed were the (#8) Cap Sensitivity Test and the U.N. Test 1 (a): U.N. Gap Test.

The Cap Sensitivity Test is used to determine the susceptibility of energetic materials to detonation from the energy (shock) delivered by a standard detonator (No. 8 blasting cap). A cardboard container of 80-mm minimum diameter, 160-mm minimum length, and 1.5-mm maximum wall thickness was filled with the test substance. The filled tube was positioned over a 1.0-mm thick, 160-mm square mild steel witness plate. The plate was supported by a 50-mm tall, 100-mm inner diameter, 3.5-mm thick steel ring, and a 25-mm thick, 152-mm square steel base plate. Initiation was provided by a standard detonator. The result is considered positive if the witness plate is torn or otherwise penetrated. Bulges, cracks, or folds in the plate do not indicate cap sensitivity. Normally three trials are conducted unless a positive result occurs earlier.

The U.N. Test 1 (a): U.N. Gap Test is used to measure the ability of a substance under confinement to propagate a detonation by subjecting it to a detonation from a booster charge. The sample was loaded to the top of a cold-drawn, seamless carbon steel tube with an external diameter of 48±2 mm, a wall thickness of 4 mm, and a length of 400±5 mm. The bottom of the tube was closed with a plastic sheet pulled tightly (so that it plastically deformed) over the bottom of the tube and was held tightly in place. The booster charge consists of 160 g PETN/TNT which has a minimum of 50% PETN, 50±1 mm in diameter with a density of 1,600±50 kg/m3. A mild steel witness plate, 150±10 mm square and 3 mm thick was mounted at the upper end of the steel tube and separated from it by spacers 1.6±0.2 mm thick. The filled tube was placed in the vertical position and the booster was placed in direct contact with the plastic sheet/steel tube. The booster was initiated by a standard detonator (No. 8 blasting cap). The test is normally performed three times unless a positive result is observed earlier. The test result is considered positive if the steel tube is fragmented completely or a hole is punched through the witness plate. A positive test result indicates that the material is able to propagate a detonation.

Results

Table 7 below shows the results of the detonability testing. Based on the test results, the Pilot Plant Inventive Granular Fertilizer is not cap sensitive and not shock sensitive in the concentrations tested as outlined in Table 7. Table 8 depicts the seven (7) concentrations tested on the Pilot Plant Inventive Granular Fertilizer.

TABLE 7

Summary of Detonability Testing

| Test | Conditions and Results | Pass/Fail |
|---|---|---|
| Cap Sensitivity Test | 6%, 10%, 15%, 8%, 9%, and 7% Fuel Oil Test Results: The witness plate was not torn, perforated, or otherwise penetrated. The witness plate was perfectly flat and unaltered from the tests. No material participation, material scattered after each trial. | Pass (Not Cap Sensitive) |
| Shock Sensitivity Test (UN Zero Gap) | 6% Fuel Oil: Large pieces of the steel tube were found post-test. The pipe was NOT fragmented completely, and a hole was NOT punched through the witness plate. The witness plate was flat after the test.
10% Fuel Oil: Large pieces of the steel tube were found post-test. The pipe was NOT fragmented completely, and a hole was NOT punched through the witness plate. The witness plate had a slight "v".
15% Fuel Oil: Large pieces of the steel tube were found post-test. Some of the pipe remained in tact near the bottom. The pipe was NOT fragmented completely, and a hole was NOT punched through the witness plate. The witness plate was flat after the test and based on the pipe fragmentation, was the least severe of all the tests. Material was too saturated (too fuel rich).
8% Fuel Oil: Large pieces of the steel tube were found post-test. The pipe was NOT fragmented completely, and a hole was NOT punched through the witness plate. The witness plate had a "v" slightly more severe than the 10% trial.
9% Fuel Oil: Large pieces of the steel tube were found post-test. The pipe was NOT fragmented completely, and a hole was NOT punched through the witness plate. The witness plate had a "v" slightly less severe than the 8% and 10% trial.
7% Fuel Oil: Large pieces of the steel tube were found post-test. The pipe was NOT fragmented completely, and a hole was NOT punched | Pass (Not Sensitive to Shock Stimulus) |

TABLE 7-continued

Summary of Detonability Testing

| Test | Conditions and Results | Pass/Fail |
|---|---|---|
| | through the witness plate. The witness plate had a "v" slightly similar to the 9% trial. | |

TABLE 8

Tested Concentrations of Pilot Plant Inventive Granular Fertilizer

| Sample | Pilot Plant Inventive Granular Fertilizer (wt %) | Fuel Oil (wt %) |
|---|---|---|
| 1 | 94 | 6 |
| 2 | 90 | 10 |
| 3 | 85 | 15 |
| 4 | 92 | 8 |
| 5 | 91 | 9 |
| 6 | 93 | 7 |

The compositions and methods described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the compositions and methods in addition to those shown and described herein will become apparent to those skilled in the art from the foregoing description. Such modifications are also intended to fall within the scope of the disclosure. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A desensitized fertilizer product, comprising:
a liquid fertilizer material comprising a nitrate group,
a plurality of particles distributed throughout the fertilizer material, wherein the particles comprise monoammonium phosphate, diammonium phosphate, or a combination thereof,
wherein the particles are formed, under heat, from a reaction product of the liquid fertilizer material and a liquid solution of ammonium polyphosphate having a total nitrogen content as N from about 10 to about 12 weight percent and a total phosphorous content as $P_2O_5$ from about 34 to about 38 weight percent based on the total weight of the ammonium polyphosphate solution, and
wherein the ammonium polyphosphate solution is present in an amount of about 20 to 70 weight percent based on the total dry weight basis of the desensitized fertilizer product.

2. The desensitized fertilizer product of claim 1, wherein the liquid fertilizer material is selected from the group consisting of ammonium nitrate, ammonium sulfate nitrate, calcium nitrate, potassium nitrate, sodium nitrate, and calcium ammonium nitrate.

3. The desensitized fertilizer product of claim 1, wherein the liquid fertilizer material is ammonium nitrate.

4. The desensitized fertilizer product of claim 1, wherein the ammonium polyphosphate solution is present in an amount of about 20 to 50 weight percent based on the total dry weight basis of the desensitized fertilizer product.

5. The desensitized fertilizer product of claim 1, further comprising a plurality of polyphosphate particles distributed throughout the fertilizer material.

6. The desensitized fertilizer product of claim 1, wherein the ammonium polyphosphate solution is present in an amount greater than 20 weight percent to about 70 weight percent.

7. A desensitized fertilizer granule, comprising:
a liquid fertilizer material comprising ammonium nitrate,
a plurality of particles distributed throughout the liquid fertilizer material, wherein the particles comprise monoammonium phosphate, diammonium phosphate, polyphosphate, or combinations thereof,
wherein the particles are formed, under heat, from a reaction product of the liquid fertilizer material and a liquid solution of ammonium polyphosphate having a total nitrogen content as N from about 10 to about 12 weight percent and a total phosphorous content as $P_2O_5$ from about 34 to about 38 weight percent based on the total weight of the ammonium polyphosphate solution, and
wherein the ammonium polyphosphate solution is present in an amount of about 30 to 60 weight percent based on the total dry weight basis of the desensitized fertilizer granule.

8. The desensitized fertilizer granule of claim 7, wherein the particles comprise monoammonium phosphate and diammonium phosphate, and the monoammonium phosphate particles are present in the granule in a greater amount than the diammonium phosphate particles.

9. The desensitized fertilizer granule of claim 8, wherein the monoammonium phosphate particles are present in an amount of about 20 to about 50 weight percent and the diammonium phosphate particles are present in an amount of about 5 to about 20 weight percent, based on the total weight of the granule.

10. The desensitized fertilizer granule of claim 7, wherein the ammonium polyphosphate solution is present in an amount of about 30 to 40 weight percent based on the total dry weight basis of the desensitized fertilizer granule.

11. A desensitized fertilizer granule, comprising:
a liquid fertilizer material comprising a nitrate group,
a plurality of orthophosphate and polyphosphate particles distributed throughout the fertilizer material, wherein the orthophosphate particles comprise monoammonium phosphate, diammonium phosphate, ammonium phosphate, or combinations thereof,
wherein the orthophosphate and polyphosphate particles are formed, under heat, from a reaction product of the fertilizer material and a liquid solution of ammonium polyphosphate having a total nitrogen content as N from about 10 to about 12 weight percent and a total phosphorouscontent as $P_2O_5$ from about 34 to about 38 weight percent based on the total weight of the ammonium polyphosphate solution, and wherein the ammonium polyphosphate solution is present in an amount of about 30 to 60 weight percent based on the total dry weight basis of the desensitized fertilizer granule.

12. The desensitized fertilizer granule of claim 11, wherein the liquid fertilizer material is selected from the group consisting of ammonium nitrate, ammonium sulfate nitrate, calcium nitrate, potassium nitrate, sodium nitrate, and calcium ammonium nitrate.

13. The desensitized fertilizer granule of claim 11, wherein the liquid fertilizer material is ammonium nitrate.

14. The desensitized fertilizer granule of claim 11, wherein the ammonium polyphosphate solution is present in an amount of about 30 to 50 weight percent based on the total dry weight basis of the desensitized fertilizer product.

15. The desensitized fertilizer granule of claim 11, wherein the ammonium polyphosphate solution is present in in an amount of about 30 to 40 weight percent based on the total dry weight basis of the desensitized fertilizer product.

\* \* \* \* \*